United States Patent
Sheraizin et al.

(10) Patent No.: US 7,526,142 B2
(45) Date of Patent: Apr. 28, 2009

(54) ENHANCEMENT OF DECOMPRESSED VIDEO

(76) Inventors: Vitaly S. Sheraizin, 28B Hamagen St., Mazkeret Batya 76804 (IL); Semion M. Sheraizin, 28B Hamagen St., Mazkeret Batya 76804 (IL)

( * ) Notice: Subject to any disclaimer, the term of this patent is extended or adjusted under 35 U.S.C. 154(b) by 352 days.

(21) Appl. No.: 11/061,734

(22) Filed: Feb. 22, 2005

(65) Prior Publication Data

US 2006/0188168 A1 Aug. 24, 2006

(51) Int. Cl.
*G06K 9/40* (2006.01)

(52) U.S. Cl. .................. 382/275; 348/699; 382/233

(58) Field of Classification Search ............ 382/275, 382/300, 254, 255, 260, 251, 266, 264, 263, 382/233, 253, 168, 172, 166; 370/229; 375/240.08, 375/240.12, 240.16, 240.01, E7.094; 348/E5.067, 348/699; 347/43
See application file for complete search history.

(56) References Cited

U.S. PATENT DOCUMENTS

| | | |
|---|---|---|
| 2,697,758 A | 12/1954 | Little, Jr. |
| 3,961,133 A | 6/1976 | Bennett |
| 4,855,825 A | 8/1989 | Haikonen et al. |
| 4,947,255 A | 8/1990 | Jackson et al. |
| 5,012,333 A | 4/1991 | Lee et al. |
| 5,126,847 A | 6/1992 | Kori et al. |
| 5,194,943 A | 3/1993 | Tomita et al. |
| 5,245,445 A | 9/1993 | Fujisawa |
| 5,301,016 A | 4/1994 | Gehrmann |
| 5,339,171 A | 8/1994 | Fujisawa |
| 5,341,442 A | 8/1994 | Barrett |
| 5,404,174 A | 4/1995 | Sugahara |
| 5,467,404 A | 11/1995 | Vuylsteke |
| 5,488,675 A | 1/1996 | Hanna |
| 5,491,514 A | 2/1996 | Fukada et al. |
| 5,491,517 A | 2/1996 | Kreitman et al. |
| 5,491,519 A | 2/1996 | Kim |
| 5,537,510 A | 7/1996 | Kim |
| 5,539,475 A | 7/1996 | Sadjadian et al. |
| 5,542,008 A | 7/1996 | Sugahara et al. |
| 5,557,340 A | 9/1996 | Millward |
| 5,565,921 A | 10/1996 | Sasaki et al. |
| 5,566,251 A | 10/1996 | Hanna et al. |
| 5,586,200 A | 12/1996 | Devaney et al. |
| 5,592,226 A | 1/1997 | Dickenson et al. |
| 5,613,035 A | 3/1997 | Kim |

(Continued)

FOREIGN PATENT DOCUMENTS

EP 0502615 9/1992

(Continued)

OTHER PUBLICATIONS

Yang et al., "Noise Estimation for blocking artifacts reduction in DCT coded images" IEEE, trans on circuit and systems for video technology, Oct. 200, pp. 116-1120, vol. 10 No. 7.*

(Continued)

*Primary Examiner*—Sheela C Chawan

(57) ABSTRACT

A method and apparatus for enhancing the video quality of compressed video signals adaptively removes distortions and ringing effects embedded in the decompressed images. The apparatus operates in conjunction with decoder devices installed in set-top boxes, satellite receivers, TV broadcast channel servers, digital still cameras, DVD players and recorders, large screen TV sets, media players, and the like.

49 Claims, 15 Drawing Sheets

U.S. PATENT DOCUMENTS

| | | | |
|---|---|---|---|
| 5,627,937 A | 5/1997 | Kim | |
| 5,653,234 A | 8/1997 | Kim et al. | |
| 5,694,492 A | 12/1997 | Kim | |
| 5,717,463 A | 2/1998 | Brailean et al. | |
| 5,774,593 A | 6/1998 | Zick | |
| 5,787,203 A | 7/1998 | Lee et al. | |
| 5,790,195 A | 8/1998 | Ohsawa | |
| 5,796,864 A | 8/1998 | Callahan | |
| 5,828,776 A | 10/1998 | Lee et al. | |
| 5,838,835 A | 11/1998 | Martens | |
| 5,844,607 A | 12/1998 | Gebler et al. | |
| 5,844,614 A | 12/1998 | Chong et al. | |
| 5,845,012 A | 12/1998 | Jung | |
| 5,847,766 A | 12/1998 | Peak | |
| 5,847,772 A | 12/1998 | Wells | |
| 5,850,294 A | 12/1998 | Apostolopoulos et al. | |
| 5,852,475 A | 12/1998 | Gupta et al. | |
| 5,870,501 A | 2/1999 | Kim | |
| 5,881,174 A | 3/1999 | Kim | |
| 5,883,983 A | 3/1999 | Lee et al. | |
| 5,901,178 A | 5/1999 | Lee et al. | |
| 5,914,748 A | 6/1999 | Parulski et al. | |
| 5,974,159 A | 10/1999 | Lubin et al. | |
| 5,982,926 A | 11/1999 | Kuo et al. | |
| 5,991,464 A | 11/1999 | Hsu et al. | |
| 5,995,656 A | 11/1999 | Kim | |
| 6,005,626 A | 12/1999 | Ding | |
| 6,014,172 A | 1/2000 | Niesen | |
| 6,037,986 A | 3/2000 | Gouliardon | |
| 6,055,340 A | 4/2000 | Nagao | |
| 6,094,511 A | 7/2000 | Metcalfe et al. | |
| 6,097,848 A | 8/2000 | Salvati | |
| 6,100,625 A | 8/2000 | Yamamoto | |
| 6,130,723 A | 10/2000 | Medin | |
| 6,191,772 B1 | 2/2001 | Mical et al. | |
| 6,229,925 B1 | 5/2001 | Alexandre et al. | |
| 6,236,751 B1 | 5/2001 | Farrell | |
| 6,259,489 B1 | 7/2001 | Flannaghan et al. | |
| 6,282,299 B1 | 8/2001 | Tewfik et al. | |
| 6,366,705 B1 | 4/2002 | Chiu et al. | |
| 6,385,647 B1 | 5/2002 | Willis et al. | |
| 6,404,460 B1 | 6/2002 | Chen et al. | |
| 6,463,173 B1 | 10/2002 | Tretter | |
| 6,466,912 B1 | 10/2002 | Johnston | |
| 6,473,532 B1 | 10/2002 | Sheraizin et al. | |
| 6,509,158 B1 | 1/2003 | Schwartz | |
| 6,522,425 B2 | 2/2003 | Tran | |
| 6,554,181 B1 | 4/2003 | Dammers et al. | |
| 6,559,826 B1 | 5/2003 | Mendelson et al. | |
| 6,567,116 B1 | 5/2003 | Aman et al. | |
| 6,580,825 B2 | 6/2003 | Bhaskar | |
| 6,610,256 B2 | 8/2003 | Schwartz | |
| 6,628,327 B1 | 9/2003 | Aoki et al. | |
| 6,643,398 B2 | 11/2003 | Moriwaki | |
| 6,707,487 B1 | 3/2004 | Aman et al. | |
| 6,728,317 B1 | 4/2004 | Demos | |
| 6,757,449 B1 | 6/2004 | Loce | |
| 6,782,287 B2 | 8/2004 | Grzeszczuk et al. | |
| 6,835,693 B2 | 12/2004 | Bourdelais et al. | |
| 6,845,181 B2 | 1/2005 | Dupin et al. | |
| 6,847,391 B1 | 1/2005 | Kassatly | |
| 6,873,442 B1 | 3/2005 | Gindele et al. | |
| 6,940,545 B1 | 9/2005 | Ray et al. | |
| 6,940,903 B2 * | 9/2005 | Zhao et al. | 375/240.08 |
| 6,970,506 B2 * | 11/2005 | Kim et al. | 375/240.01 |
| 7,049,074 B2 | 5/2006 | Schwartz | |
| 7,110,601 B2 | 9/2006 | Yanagisawa et al. | |
| 7,133,451 B2 * | 11/2006 | Kim et al. | 375/240.16 |
| 7,139,425 B2 | 11/2006 | Takahashi | |
| 7,164,717 B2 * | 1/2007 | Katsavounidis et al. | 375/240.12 |
| 7,221,706 B2 * | 5/2007 | Zhao et al. | 375/240.08 |
| 2001/0003545 A1 | 6/2001 | Hong | |
| 2002/0015508 A1 | 2/2002 | Hannigan et al. | |
| 2002/0122494 A1 | 9/2002 | Sheraizin et al. | |
| 2002/0140854 A1 | 10/2002 | Lan | |
| 2002/0181598 A1 | 12/2002 | Vetro et al. | |
| 2003/0107681 A1 | 6/2003 | Otawars et al. | |
| 2003/0122969 A1 | 7/2003 | Higuchi | |
| 2003/0152283 A1 | 8/2003 | Moriwaki | |
| 2004/0091145 A1 | 5/2004 | Kohashi et al. | |
| 2004/0184673 A1 | 9/2004 | Watanabe | |
| 2004/0190789 A1 | 9/2004 | Liu et al. | |
| 2005/0013485 A1 | 1/2005 | Masaki | |
| 2005/0259185 A1 | 11/2005 | Kim et al. | |
| 2006/0013503 A1 | 1/2006 | Kim | |

FOREIGN PATENT DOCUMENTS

| | | |
|---|---|---|
| EP | 0729117 | 8/1996 |
| GB | 1503612 | 3/1978 |
| JP | 55-71363 | 5/1980 |
| JP | 6-133221 | 7/1985 |
| JP | 01206775 | 8/1989 |
| JP | 4-83480 | 3/1992 |
| JP | 08-191440 | 7/1996 |
| WO | WO00/19726 | 4/2000 |

OTHER PUBLICATIONS

M. Mancuso, M. Besana, R. Poluzzi, "A New Post-Processing Algorithm to Reduce Artifacts in Block-Coded Images", IEEE Trans on Consumer Electronics, Aug. 1997, pp. 303-307, vol. 43 No. 3.

J. Yang, H. Choi, T. Kim, "Noise Estimation for Blocking Artifacts Reducation in DCT Coded Images", IEEE Trans on Circuits and Systems for Video Technology, Oct. 2000, pp. 1116-1120, vol. 10 No. 7.

C.J. Kuo, R.J.Hsieh, "Adaptive Postprocessor for Block Encoded Images", IEEE Trans on Circuits and Systems for Video Technology, Aug. 1995, pp. 298-304, vol. 5 No. 4.

C. H Min, S. Cho, K.W. Lim, H. Lee, "A New Adaptive Quantization Method to Reduce Blocking Effect", IEEE Trans on Consumer Electronics, Aug. 1998, pp. 768-772, vol. 44 No. 3.

Y. H. Chan, S.W. Hong, W.C. Sin, "A Practical Postprocessing Technique for Real-Time Block-Based Coding System", IEEE Trans on Circuits and Systems for Video Technology, Feb. 1998, pp. 4-8, vol. 8 No. 1.

C. M. Liu, C.N Wang, JY Lin, "A New Postprocessing Method for the Block Based DCT Coding Based on the Convex-Projection Theory", IEEE Trans on Consumer Electronics, Aug. 1998, pp. 1054-1061, vol. 4, No. 3.

J. W. Lee, J. W. Park, M.H. Yang, S Kang, Y. Choe, "Efficient Algorithm and Architecture for Post-processor in HDTV", IEEE Trans on Consumer Electronics, Feb. 1998, pp. 16-26, vol. 44, No. 1.

Y.C. Choung, J.K. Paik, "A Fast Adoptive Image Restoration Filter for Reducing Block Artifact in Compressed Images", IEEE Trans on Consumer Electronics, Nov. 1997, pp. 1340-1346, vol. 43 No. 4.

G. Lakhani, N. Zhong, "Derivation of Prediction Equation for Blocking Effect Reduction", IEEE Trans on Circuits and Systems for Video Technology, Apr. 1999, pp. 415-418, vol. 9 No. 3.

B. Jeon, J. Jeong, "Blocking Artifacts Reduction in Image Compression with Block Boundary Discontinuity Criterion", IEEE Trans on Circuits and Systems for Video Technology, Jun. 1998, pp. 345-357, vol. 8 No. 3.

T. Meier, K.N. Ngan, G. Grebbin, "Reduction of Blocking Artifacts in Image and Video Coding", IEEE Trans on Circuits and Systems for Video Technology, Apr. 1999, pp. 490-500, vol. 9 No. 3.

Banhom, et al., "Digital Image Restoration", *IEEE Signal Proc.*, (Mar. 1997),24-41.

Belkacem-Boussaid, "A New Image Smoothing Method Based on a Simple Model of Spatial Processing in the Earl Stages of Human Vision", *IEEE Trans. on Image Proc.*, vol. 9, No. 2,(Feb. 2000),220-226.

Kim, Yeong T., "Contrast enhancement using brightness preserving bi-histogram equalization", *IEEE trans on consumer electronics*, vol. 43, No. 1(Feb. 1997),1-8.

Kim, Tae K., et al., "Contrast enhancement system using spatially adaptive histogram equalization with temporal filtering", *IEEE trans on consumer electronics*, vol. 44, No. 1,(Feb. 1998),82-87.

Sakaue, Shigeo et al., "Adaptive gamma processing of the video camera for expansion of the dynamic range", *IEEE trans on consumer electronics*, vol. 41, No. 3,(Aug. 1995),555-582.

Russ, John C., "The image processing handbook", *CRS press Inc.*, (1995),674.

Talluri, Raj et al., "A Robust, Scalable, Object-Based Video compression Technique for Very Low Bit-Rate Coding", *IEEE Transaction of Circuit and Systems for Video Technology*, (Feb. 1997),vol. 7, No. 1.

Awadkh, Al-Asmari "An Adaptive Hybrid Coding Scheme for HDTV and Digital Sequences", *IEEE Transactions on Consumer Electronics*, vol. 42, No. 3,(Aug. 1995),926-936.

Kwok, Tung Lo "Predictive Mean Search Algorithms for Fast VQ Encoding of Images", *IEEE Transactions On Consumer Electronics*, vol. 41, No. 2,(May 1995),327-331.

Goel, James et al., "Pre-processing for MPEG Compression Using Adaptive Spatial Filtering", *IEEE Transactions On Consumer Electronics*, vol. 41, No. 3,(Aug. 1995),687-698.

Feng, Jian et al., "Motion Adaptive Classified Vector Quantization for ATM Video Coding", *IEEE Transactions on Consumer Electronics*,, vol. 41, No. 2,(May 1995),322-326.

Lan, Austin Y., et al., "Scene-Context Dependent Reference--Frame Placement for MPEG Video Coding", *IEEE Transactions on Circuits and Systems for Video Technology*, vol. 9, No. 3,(Apr. 1999),478-489.

Fan, Kuo-Chin et al., "An Active Scene Analysis-Based approach for Pseudo constant Bit-Rate Video Coding", *IEEE Transactions on Circuits and Systems for Video Technology*, vol. 8, No. 2,(Apr. 1998),159-170.

Takashi, Ida et al., "Image Segmentation and Contour Detection Using Fractal Coding", *IEEE Transitions on Circuits and Systems for Video Technology*, vol. 8, No. 8,(Dec. 1998),968-975.

Liang, Shen "A Segmentation-Based Lossless Image Coding Method for High-Resolution Medical Image Compression", *IEEE Transactions on Medical Imaging*, vol. 16, No. 3,(Jun. 1997),301-316.

Munteanu, Adrian et al., "Wavelet-Based Lossless Compression of Coronary Angiographic Images", *IEEE Transactions on Medical Imaging*, vol. 18, No. 3,(Mar. 1999),272-281.

Okumura, Akira et al., "Signal Analysis and Compression performance Evaluation of Pathological Microscopic Images", *IEEE Transactions on Medical Imaging*, vol. 16, No. 6,(Dec. 1997),701-710.

Pappas, et al., "Digital Color Restoration of Old Paintings", *IEEEE Trans. on Image Proc.*, vol. 9, No. 2,(Feb. 2000),291-294.

Kim, et al., "Impact of HVS Models on Model-based Halftoning", *IEEE Trans. on Image Proc.*, vol. 11, No. 3,(Mar. 2002),258-269.

Hentschel, et al., "Effective Parking Filter and is Implementation on a Programmable Architecture", *IEEE Trans. on Consumer Electronics*, vol. 47, No. 1,(Feb. 2001),33-39.

Yang, et al., "Maximum Likelihood Parameter Estimation for Image Ringing-Artifact Removal", *IEEE Trans. on Circuits and Systems for Video Technology*, vol. 11, No. 8,(Aug. 2001),963-973.

Immerkaer, "Use of Blur-Space of Deblurring and Edge-Preserving Noise Smoothing", *IEEE Trans On Image Proc.*, vol. 10, No. 6,(Jun. 2001),837-840.

Chan, et al., "The Digital TV Filter and Nonlinear Denoising", *IEEE Trans on Image Proc.*, vol. 10, No. 2,(Feb. 2001),231-241.

Liu, et al., "Complexity- Regularized Image Denoising", *IEEE Trans on Image Processing*, vol. 10, No. 6,(Jun. 2001),341-351.

Jostschulte, et al., "Perception Adaptive Temporal TV- noise Reduction Using Contour Preserving Prefilter Techniques", *IEEE on Consumer Electronics*, vol. 44, No. 3,(Aug. 1998),1091-1096.

Brice, Richard "Multimedia and Virtual Reality Engineering", (1997),1-8, 174-175, 280-283.

Conway, Lynn et al., "Video mirroring and Iconic Gestures: Enhancing Basic Videophones to Provide Visual Coaching and Visual Control", *IEEE Transactions on Consumer Electronics*, vol. 44, No. 2,(May 1998),388-397.

Cheol, Hong M., et al., "A new adaptive quantization method to reduce blocking effect", *IEEE transaction on consumer electronics*, vol. 44, No. 3,(Aug. 1998),768-772.

Massimo, Mancuso et al., "Advanced pre/ post processing for DCT coded images", *IEEE transactions on consumer electronics*, vol. 44, No. 3,(Aug. 1998),1039-1041.

Tao, Chen "Adaptive postfiltering of transform coefficients for the reduction of blocking artifacts", *IEEE transactions on circuits and systems for video technology*, vol. 11, No. 5,(May 2001),594-602.

Polesel, Andrea et al., "Image Enhancement Via Adaptive Unsharp Masking", *IEEE transactions on image processing*, vol. 9, No. 3,(Mar. 2000),505-510.

Olukayode, A et al., "An algorithm for integrated noise reduction and sharpess enhancement", *IEEE Transactions on Consumer Electronics*, vol. 46, No. 3,(Aug. 2000),474-480.

Sung- Hoon, Hong "Joint video coding of MPEG-2 video programs for digital broadcasting services", *IEEE transactions on broadcasting*, vol. 44, No. 2,(Jun. 1998),153-164.

Lim, Jae "Two dimensional signal and image processing", *USA Simon & Schuster*, (1990),430.

Sherazain, et al., "U.S. Appl. No. 09/524,618", (Mar. 14, 2000).

Leonard, Eugene "Considerations regarding the use of digital data to generate video backgrounds", *SMPTE journal*, vol. 87,,(Aug. 1987),499-504.

Tescher, Andrew "Multimedia is the Message", *IEEE signal processing magazine*, vol. 16, No. 1,(Jan. 1999),44-54.

Kim, et al., "An advanced contrast enhancement using partially overlapped sub-block histogram equalization", *IEEE Trans on circuits and systems for video technology*, vol. 11, No. 4,(Apr. 2001),475-484.

Stark, Alex J., "Adaptive image contrast enhancement Enhancement using generalizations of histogram equalization", *IEEE trans on image processing*, vol. 9, No. 5,(May 2000),889-896.

Hier, et al., "Real time locally adaptive contrast enhancement; A practical key to overcoming display and human visual system limitation", *SID digest*, (1993),491-495.

Chang, Dah-Chung "Image contrast enhancement based on local standard deviation", *IEEE trans on medical imaging*, vol. 17, No. 4,(Aug. 1998),518-531.

* cited by examiner

ENHANCEMENT OF DECOMPRESSED VIDEO

FIELD OF THE INVENTION

The present invention relates generally to video signal decoding and more particularly to such decoding that can improve decompressed video signals.

BACKGROUND OF THE INVENTION

Video applications require that large amounts of data be transmitted at high bit rates and with a minimal amount of signal distortion. Since the available data bandwidth of a conventional transmission channel is limited, image coding techniques are utilized to compress the large amount of digital data to fit within the limited bandwidth.

Various video compression techniques are known in the art, such as those of the joint photographic expert group (JPEG), moving picture expert group (MPEG), such the MPEG-1, MPEG-2, and MPEG-4, H-compression, such as the H.261 H.262, H.263, and H.264, and the others. In most of these compression techniques, an image to be compressed is first divided into square blocks of pixels (e.g., an 8×8 pixel block). Each of these blocks is then transformed using discrete cosine transforms (DCT) into a transformed block (with 8×8-components) containing the DCT coefficients. These transformed blocks are then quantized (i.e. limited to one of a fixed set of possible values), and run-length encoded. Often, they are also variable length coded to further reduce the statistical redundancy present in the run-length coded data. A decoder on the receiving end of the transmission reconstructs the video stream from the transmitted, compressed signals.

As broadcast systems are required to provide an ever increasing amount of data utilizing the same data bandwidth, video signals are transmitted at lower and lower bit rates. For example, to increase the number of TV channels broadcasted to the viewers over a fixed data bandwidth, the bit rate of each channel is reduced to a rate between 1.6 Mbps to 2.2 Mbps. Unfortunately, transmitting data at too low a bit rate reduces the quality of the decompressed video stream. Furthermore, distortions are introduced into the decoded image, mainly consisting of annoying visual artifacts that are especially noticeable at medium and low bit rates. Distortions can be categorized into types, including "blocking" (or "blockness"), "blurring", and "wiggles", examples of which are shown in FIGS. 1A, 1B and 1C, to which reference is now made.

The blocking effect introduces artificial edges at the boundaries of the 8×8-pixel block, due to the quantization of the transform coefficients in each block. FIG. 1A is an image of a man's face. Unfortunately, the coloring of his face in the area marked 10 is "blocky" rather than smooth. The edges of the blocks are perceived by the human eye as unnatural geometrical contours.

Quantization of transform coefficients also causes blurring of real contours present in the image, due to the reduction of the high frequency components in the DCT transformed blocks. In FIG. 1B, the areas labeled 12 are blurred.

Distortion has another side effect, where some retained frequency components remain unbalanced, causing ripples near edges. These ripples, known as "wiggles" or "mosquito noise", cause those areas with high frequency components to appear, move and disappear at random points of the frame. This can be seen in FIG. 1C, in the areas labeled 14.

Decompressed video signals may include other noise effects as well, such as blotches and ringing.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
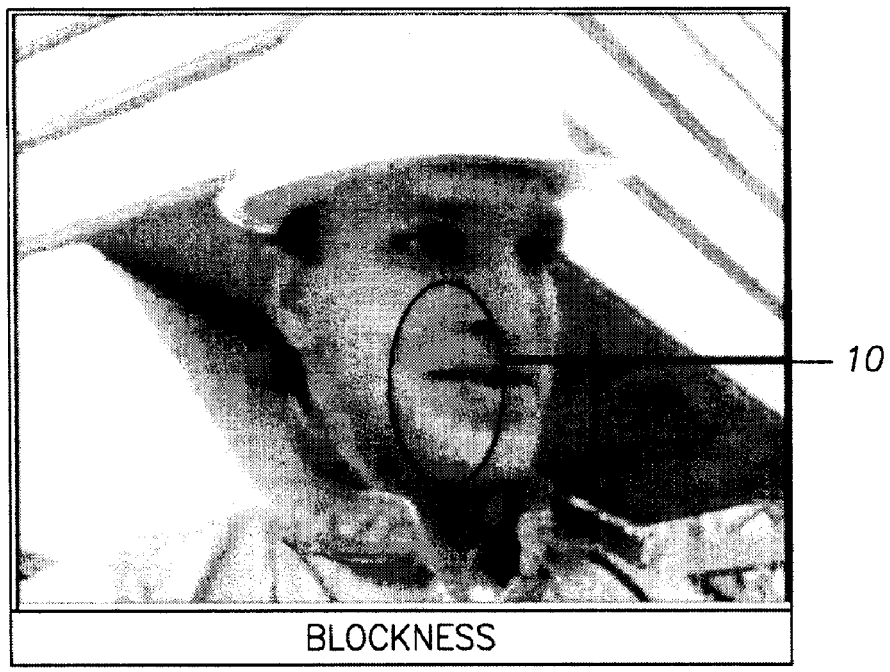
FIGS. 1A, 1B and 1C are exemplary decompressed images with exemplary types of distortions.
Figure 1B:
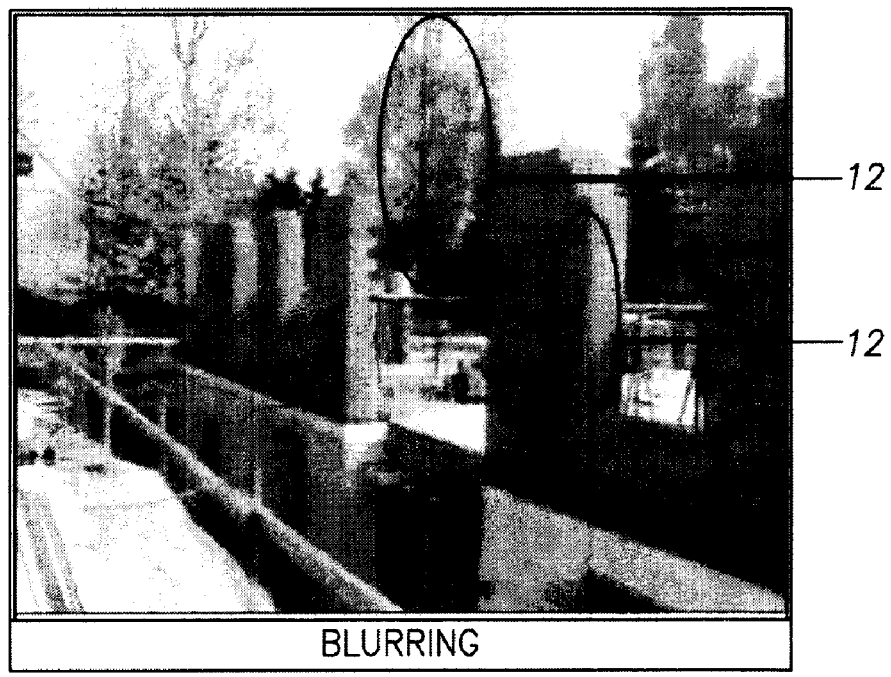
Figure 1C:
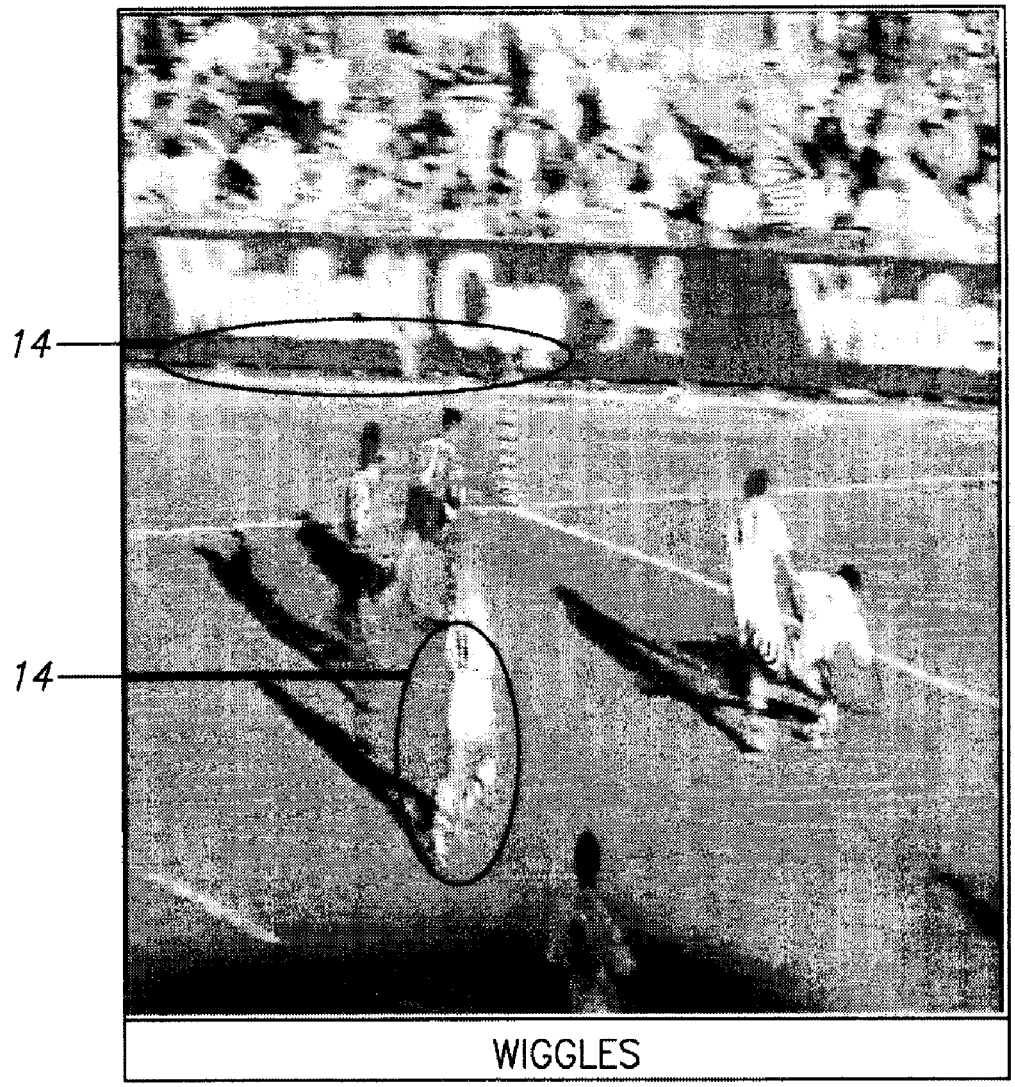

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Figure 2:
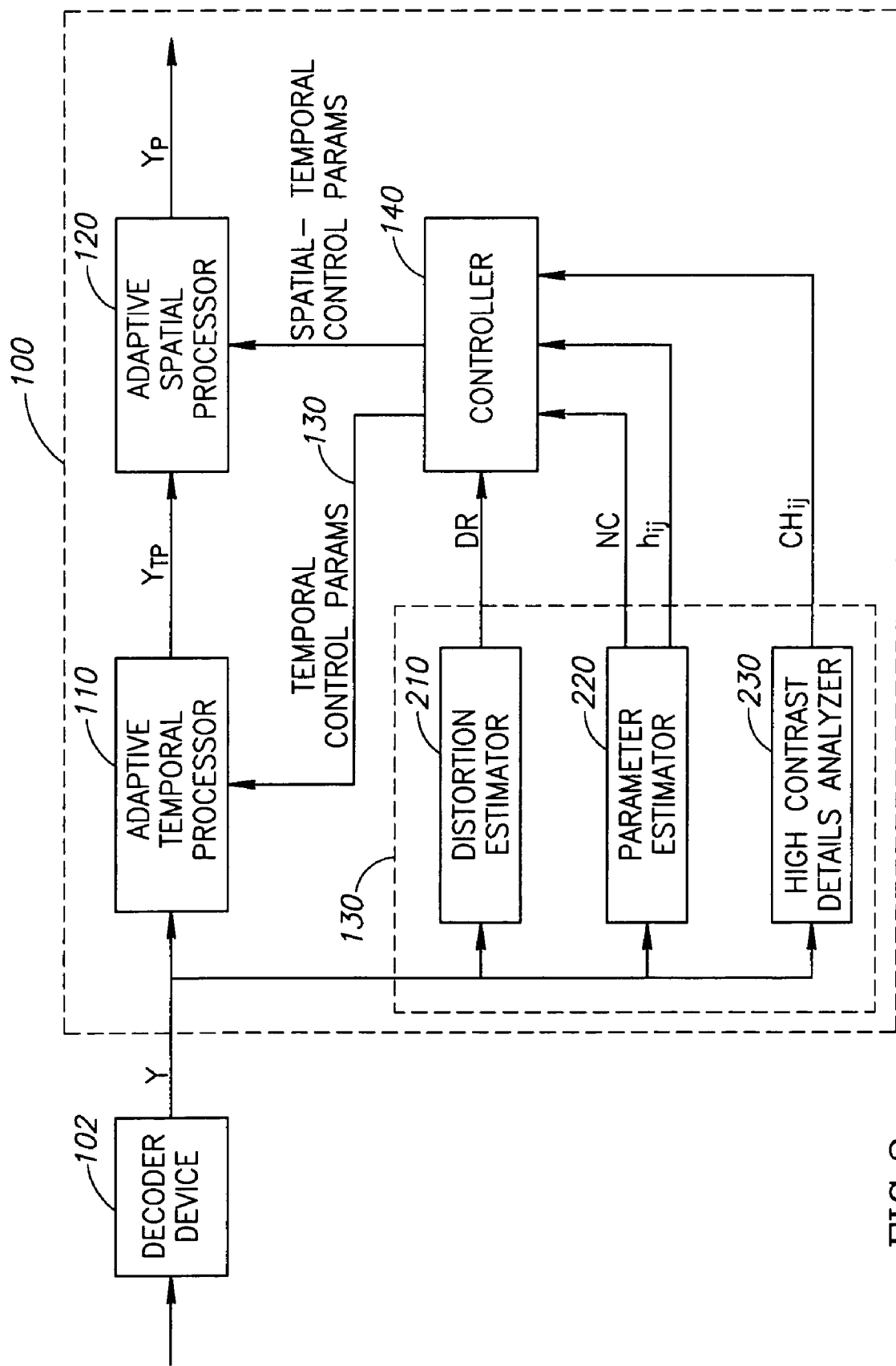
FIG. 2 is a block diagram illustration of an apparatus for improved picture quality, constructed and operative in accordance with the present invention.

Reference is now made to FIG. 2, which illustrates an exemplary and non-limiting block diagram of an apparatus 100 to improve the visual quality of images decompressed from compressed video signals, constructed and operative in accordance with the present invention. Apparatus 100 may operate in conjunction with various decoder devices 102, such as those installed in set-top boxes, satellite receivers, TV broadcast channel servers, digital still cameras, DVD players and recorders, large screen TV sets, media players, and the like, and may attempt to remove distortions and ringing effects found in the decompressed video signal, labeled Y, produced by such decoder devices 102.

Decompressed video signal Y may be decompressed from a signal encoded with coding techniques including, but not limited to, those of joint photographic expert group (JPEG), moving picture expert group (MPEG), such the MPEG-1, MPEG-2, and MPEG-4, h-compression, such as H.261, H.262, H.263 and H.264, Windows Media (WM) 9, and others. Such coding techniques typically represent the video signals with motion vectors and residual transform DCT coefficients. Each frame of the video signal is coded based on a prediction from one or more previously coded frames, and thus, properly decoding one frame requires first decoding one or more other frames. This temporal dependence between frames severely complicates a number of spatial and temporal processing techniques, such as translation, downscaling, and splicing.

In accordance with the present invention, apparatus 100 may comprise an adaptive temporal processor 110, an adaptive spatial processor 120, an estimation unit 130, and a controller 140. As described in more detail hereinbelow, estimation unit 130 may receive decompressed video signal Y and may analyze it to determine the extent of improvement necessary. Estimation unit 130 may include a distortion estimator 210, a parameter estimator 220, and a high contrast details analyzer 230. Distortion estimator 210 may estimate the amount of distortion DR by checking each block (e.g., 8×8-pixel) in an image.

Parameter estimator 220 may estimate the image complexity and may generate a value NC indicating the extent to which the image has changed from a previous image. The more complex an image, the more distorted the image may appear to the human eye. Parameter estimator 220 may also generate an $h_{ij}$ value indicating a change in intensity between a pixel (i,j) in two consecutive frames.

High contrast details analyzer 230 may analyze high contrast details in the image, such as edges and characters. High contrast details analyzer 230 may generate a per-pixel value $CH_{ij}$ indicating the extent of high contrast details at each pixel in the frame.

Controller 140 may convert the parameters generated by estimation unit 130 into temporal control parameters, which may control aspects of the processing of adaptive temporal processor 110, and spatial-temporal control parameters, useful for controlling adaptive spatial processor 120.

Adaptive temporal processor 110 may operate on decompressed signal Y, while adaptive spatial processor 120 may operate on the output, a signal $Y_{TP}$, of processor 110. The result may be an improved decompressed signal $Y_P$. Processors 110 and 120 may include temporal and spatial components such as are known in the art. In addition, processors 110 and 120 may include additional components controlled by the spatial and temporal control parameters received from controller 140. The latter may attempt to reduce the distortions and other low quality effects found in decompressed video signals. The output of adaptive spatial processor 120, the signal $Y_P$, may be an improved video signal with reduced distortions.

Figure 3:
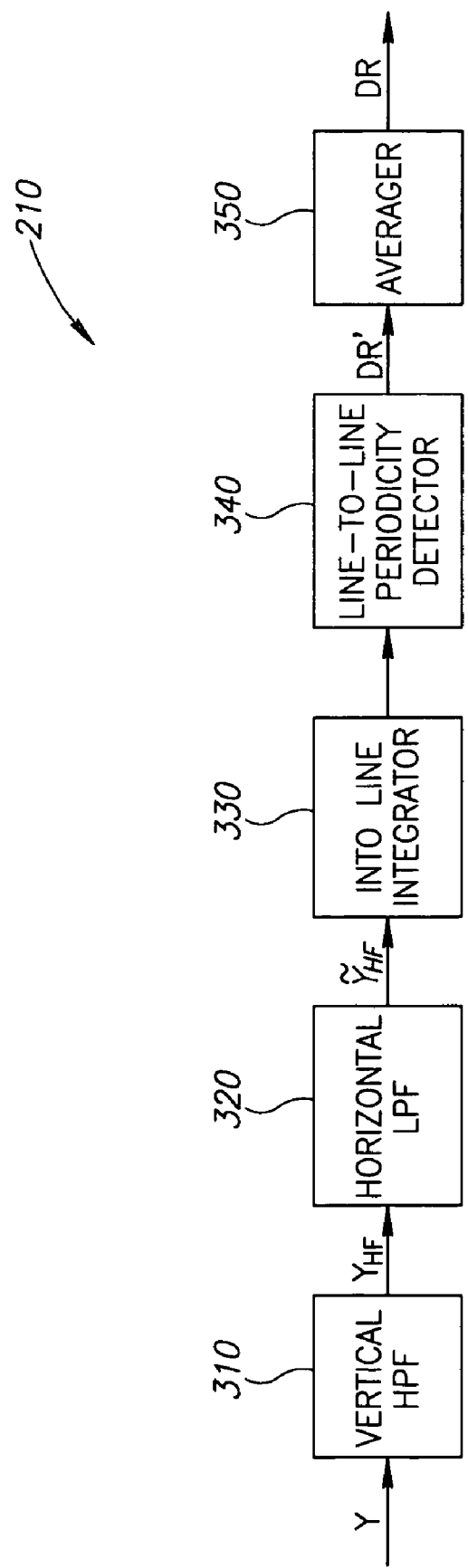
FIG. 3 is a block diagram illustration of an exemplary distortion estimator, forming part of the apparatus of FIG. 2.

Reference is now made to FIG. 3, which shows a non-limiting block diagram of distortion estimator 210 operative in accordance with an exemplary embodiment of the present invention. Distortion estimator 210 may include a vertical high pass filter (HPF) 310, a horizontal low pass filter (LPF) 320, an into line integrator 330, a line-to-line periodicity detector 340, and an averager 350.

Distortion estimator 210 may measure the blockness in the frame by counting the high frequency components along the edges of each k by k pixel block of the frame. To do so, vertical HPF 310 may transfer only the high frequency components $Y_{HF}$ of decompressed signal Y. Horizontal LPF 320 may reduce noise in the high frequency component signal $Y_{HF}$, generating thereby a signal $\tilde{Y}_{HF}$. Into line integrator 330 may sum, for each line in the frame, the number of $\tilde{Y}_{HF}$ components every $k^{th}$ pixel in the line. Line-to-line periodicity detector 340 may sum the number of high frequency components in each $k^{th}$ line and may generate the result, a value DR', as described in detail hereinbelow. The value DR' may indicate the amount of distortion in the current frame. Averager 350 may generate the distortion value DR by averaging DR' with the distortion value DR computed for the previous frames.

Figure 4:
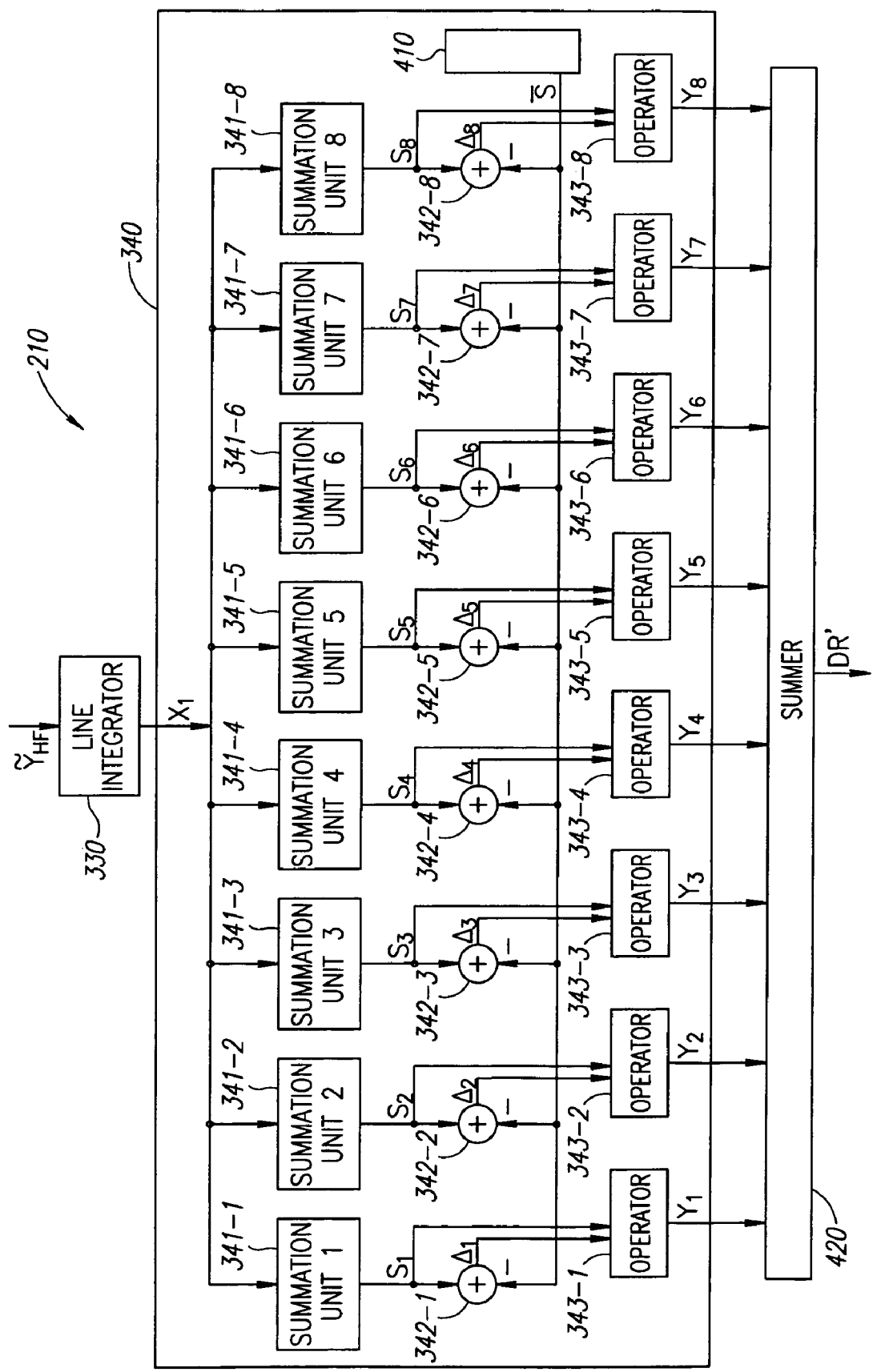
FIG. 4 is a detailed block diagram illustration of the distortion estimator of FIG. 3.

FIG. 4, to which reference is now made, shows an exemplary functional block diagram of line integrator 330 and line-to-line detector 340 for a block size of 8 by 8 pixels. Other block sizes are possible and are incorporated in the present invention.

Into line integrator 330 may sum the high frequency components $\tilde{Y}_{HF}$ of every $8^{th}$ pixel along a line l of the frame. The summation may be performed using the following equation:

$$X_l = \sum_{i=0}^{\frac{N-1}{8}} \tilde{Y}_{HF}(8i) \quad (1)$$

where N is the number of pixels in a line.

To find column edges, line-to-line periodicity detector 340 may sum the output of line integrator 330 every $8^{th}$ line, starting at different lines. Detector 340 may then sum those blocks which are distorted, defined here as those outputs above an average value.

Detector 340 may include eight summation units 341-1 through 341-8, eight adders 342-1 through 342-8, eight operators 343-1 through 343-8, an averager 410 and a summer 420. Each summation unit 341-i may accumulate the high frequency components of each $8^{th}$ line starting from the $i^{th}$ line. For example, summation unit 341-1 may operate on lines 1, 9, 17, . . . M-1, while summation unit 341-2 may operate on lines 2, 10, 18, . . . , M-1, and so on. Mathematically, the $i^{th}$ summation unit 341-i may operate as follows:

$$S_i = \sum_{j=0}^{\frac{M-1}{8}} X_l(i+8j) \quad (2)$$

where M is the maximum number of lines in a frame (e.g. M=480 for NTSC). The index i varies from 1 to 8.

Adders 342-$i$ and operators 343-$i$ together may operate to provide the value $S_i$ only if it is above an average value $\overline{S}$ of the set of values $S_i$, where average value $\overline{S}$ may be computed by averager 410 as follows:

$$\overline{S} = \frac{\sum_{i=1}^{8} S_i}{8} \quad (3)$$

Each adder 342-$i$ may subtract average value $\overline{S}$ from its associated $S_i$ and may produce a different value $\Delta_i$.

An operator 343-$i$ may utilize its associated difference value $\Delta_i$ to generate a signal $y_i$ which has the value of $S_i$ only if difference value $\Delta_i$ is positive, as follows:

$$y_i = \begin{cases} 0 & \text{if } \Delta_i \leq 0 \\ S_i & \text{if } \Delta_i > 0 \end{cases} \quad (4)$$

The values $y_i$ may indicate the extent of distortion for each $i^{th}$ portion of the frame. Summer 420 may accumulate the values of $y_i$ to generate distortion level DR' for the current frame.

Figure 5:
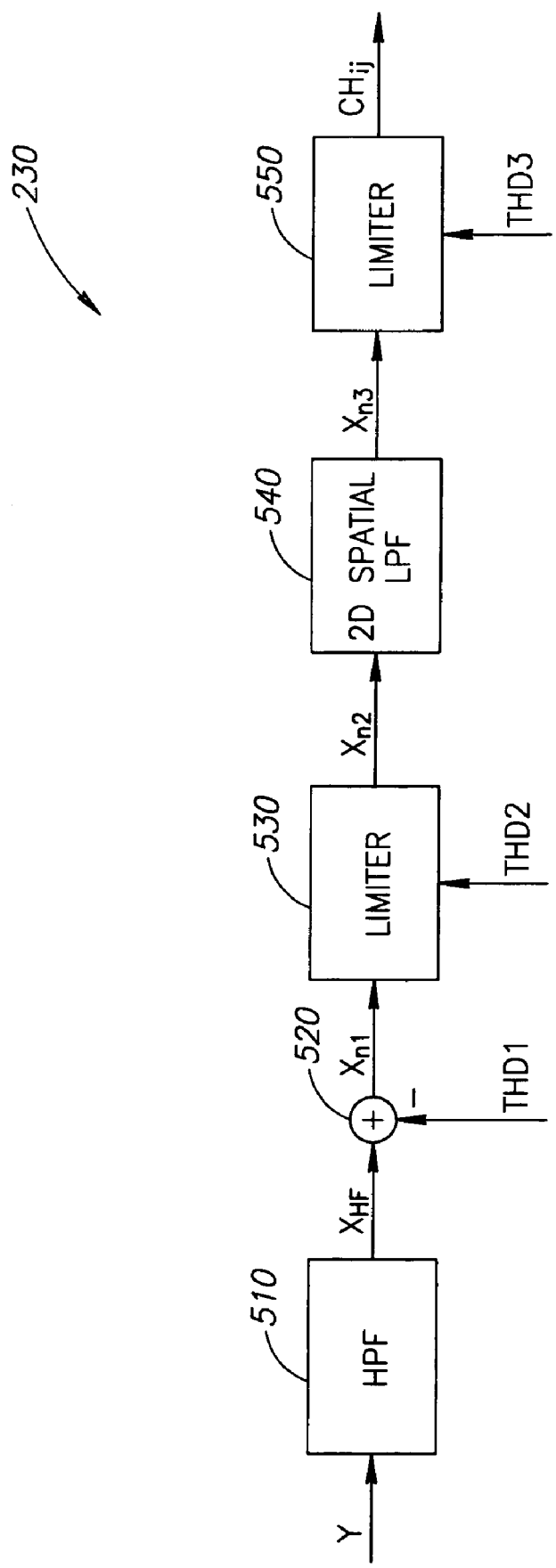
FIG. 5 is a block diagram illustration of an exemplary high contrast details analyzer forming part of the apparatus of FIG. 2.

Reference is now made to FIG. 5, which illustrates a non-limiting and exemplary block diagram of high contrast details analyzer 230. High contrast objects in video signals (e.g., text characters) may be characterized by high frequency components. In accordance with a preferred embodiment of the present invention, they may be processed as distortions. To detect high contrast details, high contrast details analyzer 230 may comprise a high pass filter (HPF) 510, an adder 520, a limiter 530, a two-dimensional low-pass filter (LPF) 540 and a second limiter 550.

HPF 510 may generate high frequency components $X_{HF}$ from input decompressed video signal Y. Adder 520 may subtract a first threshold THD1 from the $X_{HF}$ components, thereby producing a shifted signal $X_{n1}$. THD1 may be defined by the expected intensity levels of high contrast details. For example, THD1 may be set to THD1=0.25 $Y_{max}$, where $Y_{max}$ may be the maximum possible intensity level for the video signal (e.g., 256).

Limiter 530 may limit the signal intensities of the output of adder 520 (a signal $X_{n2}$) to those below a given threshold THD2, where THD2 may be set, for example, to THD2=0.1 $Y_{max}$. Specifically, the signal $X_{n2}$ output by limiter 530 may be written mathematically as follows:

$$X_{n2} = \begin{cases} 0 & \text{if } X_{n1} \leq 0 \\ X_{n1} & \text{if } 0 < X_{n1} \leq THD2 \\ THD2 & \text{if } X_{n1} > THD2 \end{cases} \quad (5)$$

2D-LPF 540 may filter the signal $X_{n2}$ to detect points (dots) in decompressed frame Y. LPF 540 may have a cutoff point which may be a function of both an expected contrast level and the size of the smallest details.

To indicate the presence of text characters in decompressed frame Y, limiter 550 may limit the intensities of signal $X_{n3}$, generated by LPF 540, to those below a given threshold THD3, where THD3 may be set to THD3=0.03 $Y_{max}$, thereby generating a per-pixel $Ch_{i,j}$ signal. The level of per-pixel signal $CH_{i,j}$ may be defined mathematically as follows:

$$CH_{i,j} = \begin{cases} 0 & \text{if } X_{n3} \leq 0 \\ X_{n3} & \text{if } 0 < X_{n3} \leq THD3 \\ THD3 & \text{if } X_{n3} > THD3 \end{cases} \quad (6)$$

Figure 6A:
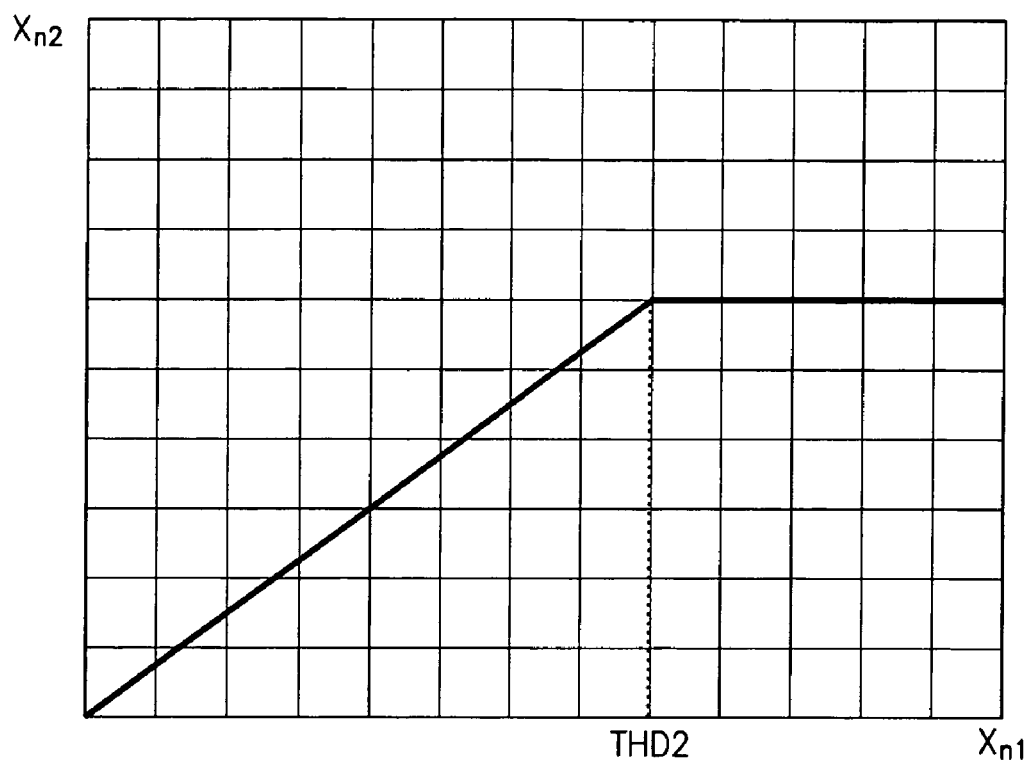
FIGS. 6A and 6B are graphical illustrations of the response of limiters, useful in understanding the operation of the high contrast details analyzer of FIG. 5.
Figure 6B:
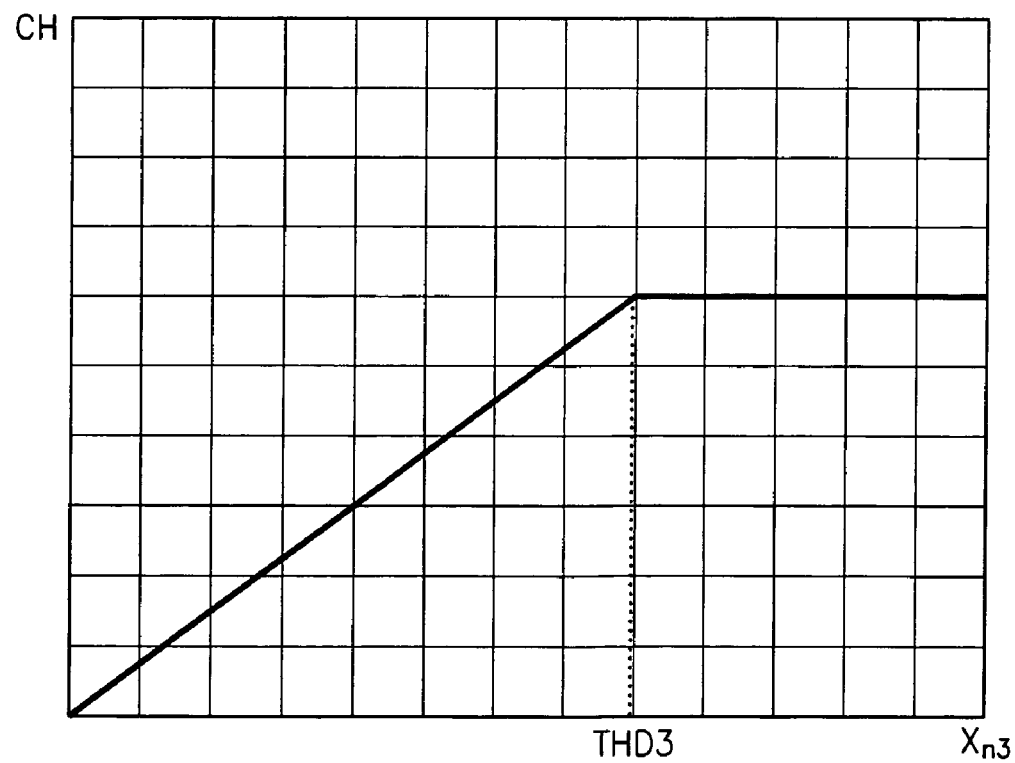

FIGS. 6A and 6B, to which reference is now briefly made, are graphical illustrations of the response of limiters 530 and 550 respectively.

Figure 7:
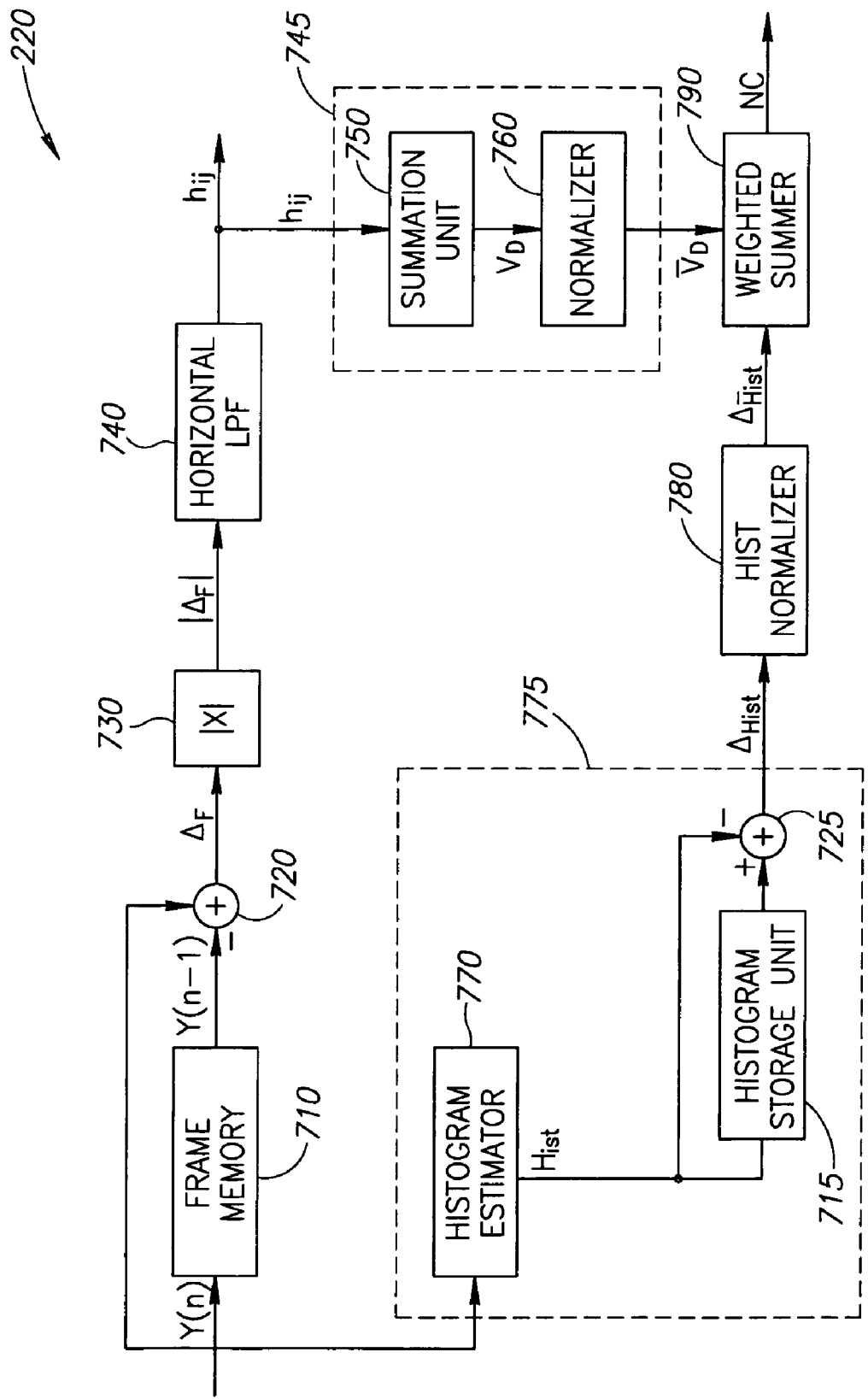
FIG. 7 is a block diagram illustration of an exemplary parameter estimator forming part of the apparatus of FIG. 2.

Reference is now made to FIG. 7, a non-limiting block diagram of parameter estimator 220, constructed and operative in accordance with an exemplary embodiment of the present invention. As mentioned above, parameter estimator 220 may estimate the image complexity NC and may generate signal change values $h_{ij}$. Image complexity NC may indicate the extent to which the image has changed from a previous frame. The signal change values $h_{ij}$ may indicate, per pixel (i,j), the intensity change between two consecutive frames.

To generate the signal change values $h_{ij}$, parameter estimator 220 may take the difference of intensity between consecutive frames, for each pixel. For this purpose, parameter estimator 220 may comprise a frame memory 710 and an adder 720. Frame memory 710 may delay decompressed frame Y(n), thereby producing a previous frame Y(n−1). Adder 720 may generate a difference frame $\Delta_F$ between previous frame Y(n−1) and current input frame Y(n).

Parameter estimator 220 may then smooth difference frame $\Delta_F$ with an absolute value operator 730 and a horizontal low pass filter (LPF) 740. Absolute value operator 730 may take the absolute value for each pixel in difference frame $\Delta_F$, generating a signal $|\Delta_F|$, and horizontal LPF 740 may generally reduce any noise that may be present in the signal $|\Delta_F|$. The intensity of each pixel (i, j) in signal $|\Delta_F|$ may be the value $h_{ij}$.

To generate image complexity NC, parameter estimator 220 may comprise a frame intensity change generator 745, which may utilize the pixel intensity changes $h_{ij}$, a histogram difference generator 775, a histogram normalizer 780 and a weighted summer 790.

Histogram difference generator 775 may determine how different a histogram of the intensities Y of the current frame (n) is from that of a previous frame (n−1). An image of the same scene generally may have a very similar collection of intensities, even if the objects in the scene have moved around, while an image of a different scene may have a different histogram of intensities. Thus, histogram difference estimator 775 may measure the extent of change in the histogram.

Histogram difference generator 775 may comprise a histogram estimator 770, a histogram storage unit 715 and an adder 725. Adder 725 may generate a difference histograms $\Delta_{Hist}$ by taking the difference between the histogram for the current frame (n) as provided by histogram estimator 770 and that of the previous frame stored in histogram storage unit 715.

Histogram normalizer 780 may normalize difference histogram $\Delta_{\overline{Hist}}$ as follows:

$$\Delta_{Hist} = \frac{\Delta_{Hist}}{N*M} \quad (7a)$$

where N and M are the maximum number of lines and columns of the frame, respectively.

Frame intensity change generator 745 may determine an overall change value $V_D$ indicating the extent of significant change in the frame and may comprise a summation unit 750 and a normalizer 760. Summation unit 750 may sum the values of $h_{ij}$ for all pixels in the in signal $|\Delta_F|$. Mathematically, summation unit 750 may perform the following equation:

$$V_D = \sum_{i=1}^{M}\sum_{j=1}^{N} h_{i,j} \quad (7b)$$

Normalizer 760 may normalize frame intensity change $V_D$, by the frame size and the maximum intensity levels. For example, normalizer 760 may divide frame intensity change $V_D$ by $M*N*Y_{max}$.

Weighted summer 790 may generate image complexity value NC from a weighted sum of normalized frame intensity change $\overline{V}_D$ and normalized difference histogram $\Delta_{\overline{Hist}}$, as follows:

$$NC = K_H \Delta_{\overline{Hist}} + K_V \overline{V}_D \quad (7c)$$

where $K_H$ and $K_V$ are the weighting coefficients and each may have a value between 0 and 1.

Figure 8:
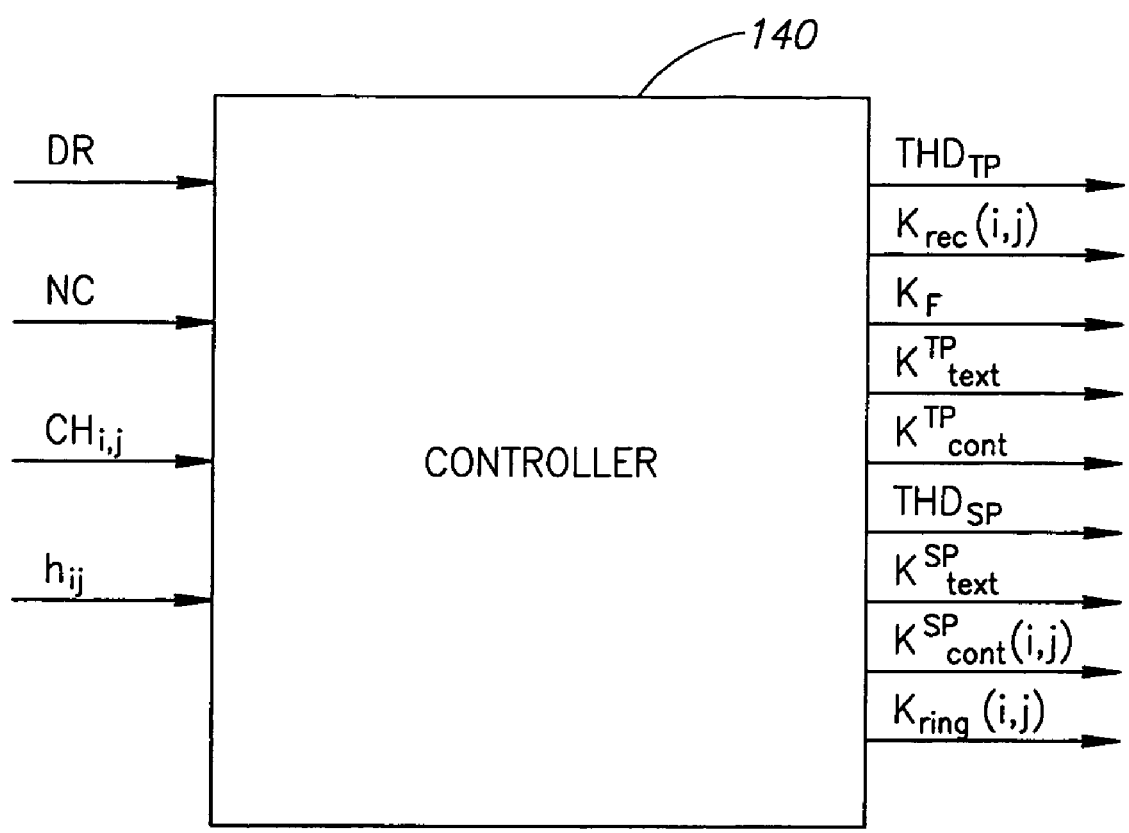
FIG. 8 is a block diagram illustration of a controller forming part of the apparatus of FIG. 2.

Reference is now made to FIG. 8, which illustrates controller 140 in accordance with an exemplary embodiment of the present invention. Controller 140 may generate temporal control parameters for adaptive temporal processor 110 and spatial-temporal control parameters for adaptive spatial processor 120 from the estimation and prediction parameters DR, $CH_{ij}$, $h_{ij}$ and NC discussed hereinabove.

Controller 140 may generate a temporal threshold $THD_{TP}$ to define the level of low contrast small details in the frame. Typically, in low contrast images, the human eye can detect small details in an image only if their intensity levels are 3 times higher than the average noise (i.e., distortion). From this, the temporal threshold $THD_{TP}$ is defined, as follows:

$$THD_{TP} = 2\lfloor(1+DR^*)+(1+NC)\rfloor \quad (8)$$

where DR* is a normalized value of DR, normalized by the quantity of blocks in a frame (e.g. N*M/8*8).

Controller 140 may generate a low-frequency coefficient $K_F$ which may be used to attenuate low frequency components to reduce blockness in the image.

$$K_F = 1 - 0.5DR^* \quad (9)$$

Controller 140 may generate a texture coefficient $K^{TP}_{text}$ and a contrast coefficient $K^{TP}_{cont}$ which may be used to reduce noise in high contrast and low contrast (i.e., texture) signals, respectively.

$$K^{TP}_{text} = 1 - DR^* \quad (10)$$

$$K^{TP}_{cont} = 1 - DR^* \quad (11)$$

Controller 140 may generate a spatial-temporal threshold $THD_{SP}$ to define the level of low contrast, small details in the frame and a spatial text coefficient $K^{SP}_{text}$ to adjust the texture sharpness in a video signal, as follows:

$$THD_{SP} = 3(1+DR^*) \quad (12)$$

$$K^{SP}_{text} = K_{text.o}(1-DR^*) \quad (13)$$

where $K_{text.o}$ is a maximum texture coefficient and may be equal or greater than 1.

Controller 140 may generate a per-pixel, spatial contrast coefficient $K^{SP}_{cont}(i,j)$ to adjust the sharpness of the small details, as follows:

$$K^{SP}_{cont}(i,j) = K_{cont.o}\lfloor 1 - 0.5(DR^* - CH_{i,j}^*) \rfloor \quad (14)$$

where $K_{cont.o}$ is a maximum contrast coefficient and may be greater than 1 and $Ch_{i,j}^*$ is a normalized value of per-pixel signal $CH_{i,j}$, normalized by $CH_{max}$, a maximum possible value of the $CH_{i,j}$.

Controller 140 may generate a per-pixel recursion coefficient $K_{rec}(i,j)$ to reduce noise, as follows:

$$K_{rec}(i,j) = K_{rec.o}\lfloor 1 + 0.25(DR^* + CH_{i,j}^*) \rfloor \quad (15)$$

where $K_{rec.o}$ is a maximum recursion coefficient and may be equal or smaller than 0.5.

As can be seen, the values of $K^{SP}_{text}$, $K_{rec}(i,j)$ and $K^{SP}_{cont}(i,j)$ depend on the amount of noise (CH) and distortion (DR) in the image. High values of these coefficients may imply high noise and distortion in the image.

Controller 140 may generate a ringing coefficient $K_{ring}(i,j)$ per pixel (i,j), to eliminate ringing effects, as follows:

$$K_{ring}(i,j) = 1 - 0.5h_{ij}^* \quad (16)$$

where $h_{ij}^*$ is the normalized value of $h_{ij}$, normalized by $h_{ij\,max}$. The ringing coefficient $K_{ring}(i,j)$ may be used to reduce or eliminate ringing effects as will be described in greater detail hereinbelow.

Figure 9:
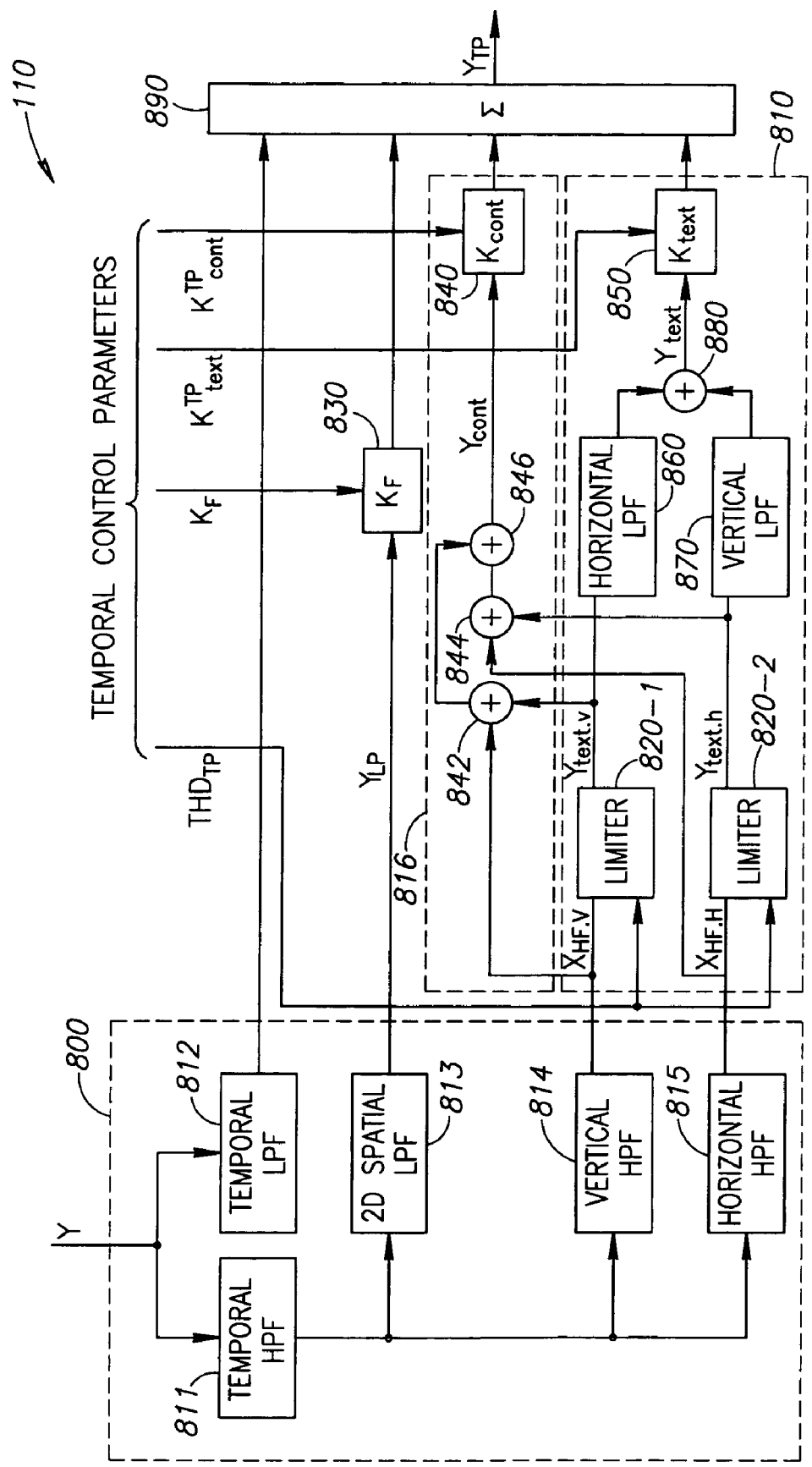
FIG. 9 is a block diagram illustration of an exemplary adaptive temporal processor forming part of the apparatus of FIG. 2.

Reference is now made to FIG. 9, which shows a non-limiting block diagram of adaptive temporal processor 110, constructed and operative in accordance with an exemplary embodiment of the present invention. Adaptive temporal processor 110 may comprise a standard temporal processor 800, a texture improver 810, a small details sharpener 816 and a blockness reducer 830.

Standard temporal processor 800 may comprise a temporal high pass filter (HPF) 811, a temporal low pass filter (LPF) 812, a two-dimensional (2D) spatial LPF 813, a vertical HPF 814, and a horizontal HPF 815 and may operate to temporally process decompressed frame Y.

Figure 12A:
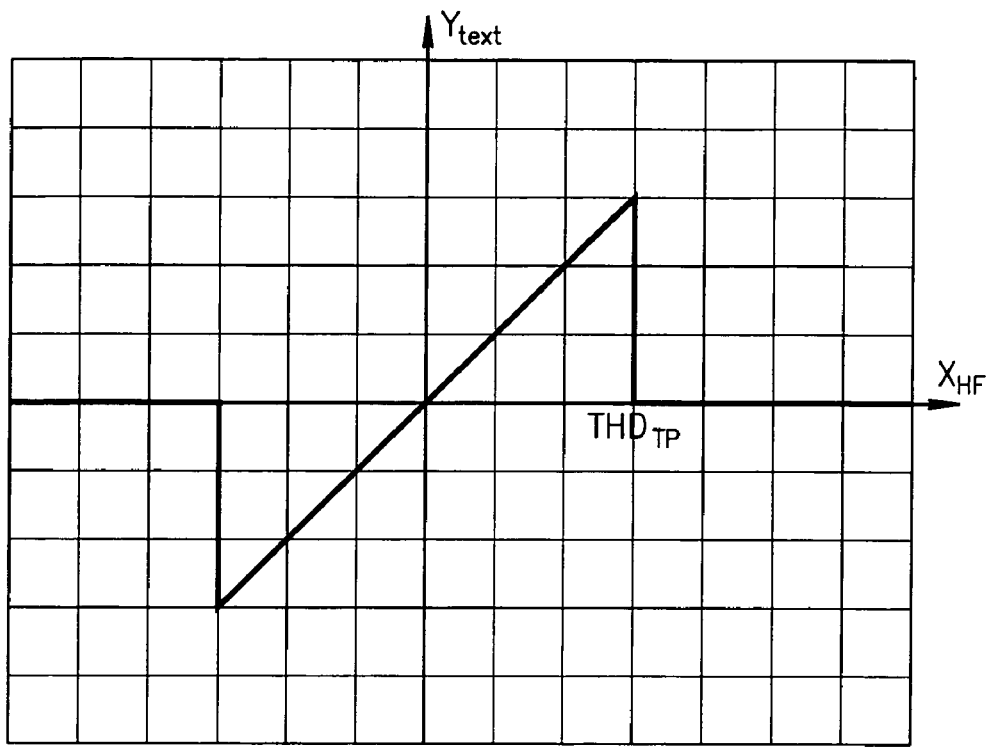
FIGS. 12A and 12B are graphical illustrations of the response of limiters, useful in understanding the operation of the processors of FIGS. 9 and 11.

Texture improver 810 may attempt to sharpen textual elements, if present, in decompressed frame Y and may comprise limiters 820-1 and 820-2, a horizontal LPF 860, a vertical LPF 870, a texture sharpener 850 and an adder 880. A graphical representation of both limiters 820-1 and 820-2 is provided in FIG. 12A.

Texture improver 810 may operate on the vertical and horizontal high frequency components (i.e. the components along a column and a row, respectively) of frame Y, generated by vertical HPF 814 and horizontal HPF 815, respectively. To sharpen text and other textured items and to reduce distortions without affecting the image quality, limiters 820 may limit the intensities of high frequency signals $X_{HF}$ to below $THD_{TP}$.

Low pass filters 860 and 870 may reduce noise from the output signals $Y_{text.v}$ and $Y_{text.h}$ of limiters 820-1 and 820-2, respectively. Specifically, low pass filter 860 may be a horizontal LPF operating on vertical signal $Y_{text.v}$ and, similarly, low pass filter 870 may be a vertical LPF operating on horizontal signal $Y_{text.h}$. It will be appreciated that such a structure may reduce noise without affecting the image sharpness. Experiments show that the expected noise reduction is around 6 dB.

Adder 880 may sum the thresholded and noise reduced signals to generate a texture signal $Y_{text}$ and texture sharpener 850 may adjust the sharpness of texture signal $Y_{text}$ with texture coefficient $K^{TP}_{text}$. It will be appreciated that sharpener 850 may reduce the texture sharpness with low values of $K^{TP}_{text}$ (present when the distortion level DR is high, as per equation 10) and may increase the sharpness for high values of $K^{TP}_{text}$. The values of $K^{TP}_{text}$ may be determined according to Eq. (10).

Small details sharpener 816 may comprise a contrast sharpener 840 and three adders 842, 844 and 846. Adders 842 and 844 may sum together the inputs and outputs of limiters 820, generating signals with strongly contrasting small details. Adder 846 may produce a linear sum of the outputs of adders 842 and 844 to generate a small details signal $Y_{cont}$. Contrast sharpener 840 may adjust the sharpness of the small details in $Y_{cont}$ using the contrast coefficient $K^{TP}_{cont}$ determined in accordance with Eq. (11). Contrast sharpener 840 may be a linear operator, i.e., it may reduce the small details sharpness with low values of $K^{TP}_{cont}$ and may increase the sharpness with high values of $K^{TP}_{cont}$.

Distortion reducer 830 may be a linear operator and may operate on the low pass filtered signals $Y_{LP}$ generated by 2D spatial LPF 813. Distortion reducer 830 may attenuate the low frequency components with coefficient $K_F$, in order to reduce blockness in the frame. The blockness coefficient $K_F$ may be determined in accordance with Eq. (9).

A summation unit 890 may accumulate the outputs of temporal low pass filter 812 (a noise reduced version of decompressed image Y), texture improver 810, small details sharpener 816 and distortion reducer 830 and may provide adaptive spatial processor 120 with signal $Y_{TP}$.

In accordance with an alternative embodiment of the present invention, adaptive temporal processor 110 may comprise an adaptive recursive filter or infinite impulse response (IIR) filter. This may allow a reduction in the number of frame memories in the system.

Figure 10:
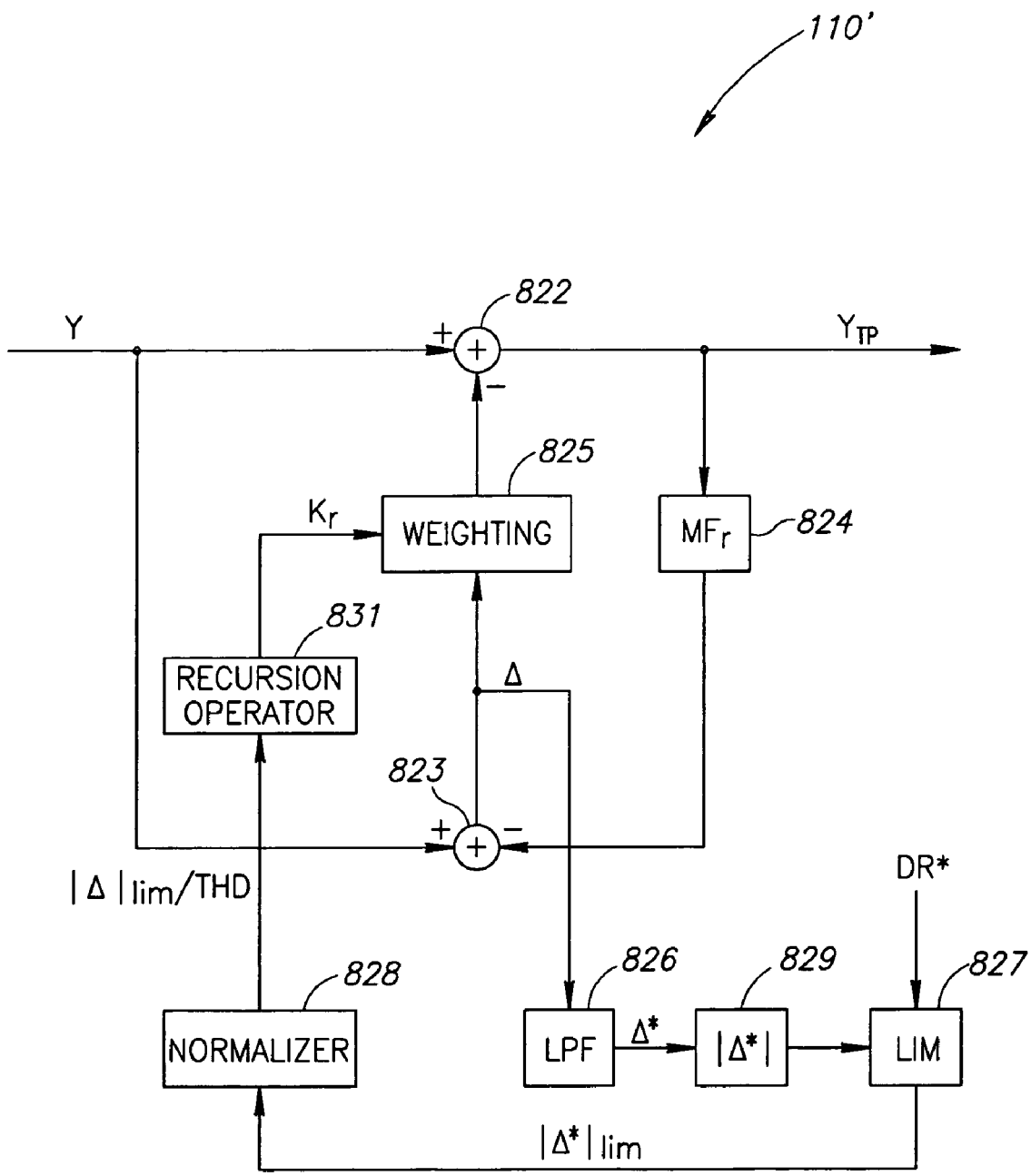
FIG. 10 is a block diagram illustration of an alternative embodiment of adaptive temporal processor, forming part of the apparatus of FIG. 2 and using an IIR filter.

A non-limiting block diagram of alternative adaptive temporal processor, labeled 110', is shown in FIG. 10. Processor 110 may have an adaptive recursion coefficient $K_r$ which may be changed according to the changes in intensity between the input Y and the processed output $Y_{TP}$ and as a function of the distortion level DR.

Processor 110' may comprise adders 822 and 823, a frame memory 824, a weighting unit 825, a low pass filter 826, limiters 827, a normalizer 828, an absolute value operator 829, and a recursion operator 831.

Adder 823 may generate a difference frame Δ between the previous output $Y_{TP}$, stored in frame memory 824 and current input frame Y.

Low pass filter LPF 826 may smooth difference frame Δ and absolute value operator 829 may generate the absolute value |Δ*| of the output of low pass filter 826. Limiter 827 may limit the value |Δ*| below a threshold level THD, described hereinbelow, and generate a signal |Δ*|$_{lim}$. Normalizer 828 may then normalize the signal |Δ*|$_{lim}$ by THD, thereby producing a value between 0 and 1.

The THD level may be set to an average block signal value and may be computed as follows:

$$THD=THD_0*(1+pDR*) \quad (17)$$

where $THD_0=0.01*Y_{max}$ and p may be equal to 2, 3, or 5.

Recursion operator 831 may generate adaptive recursion coefficient $K_r$ for the filter as follows:

$$K_r=K_{ro}*(1-|\Delta|_{lim}/THD) \quad (18)$$

where $K_{ro}$ may vary between 0 and 1.

Weighting unit 825 and adder 822 may implement the IIR filter by multiplying the difference frame Δ by adaptive recursion coefficient $K_r$ and subtracting the weighted result from input frame Y.

It will be appreciated by a person skilled in the art that for high probability blocks (i.e. blocks with low and mid contrast levels of blockness), $K_r$ is high and the noise and blockness reduction is relatively efficient.

Figure 11:
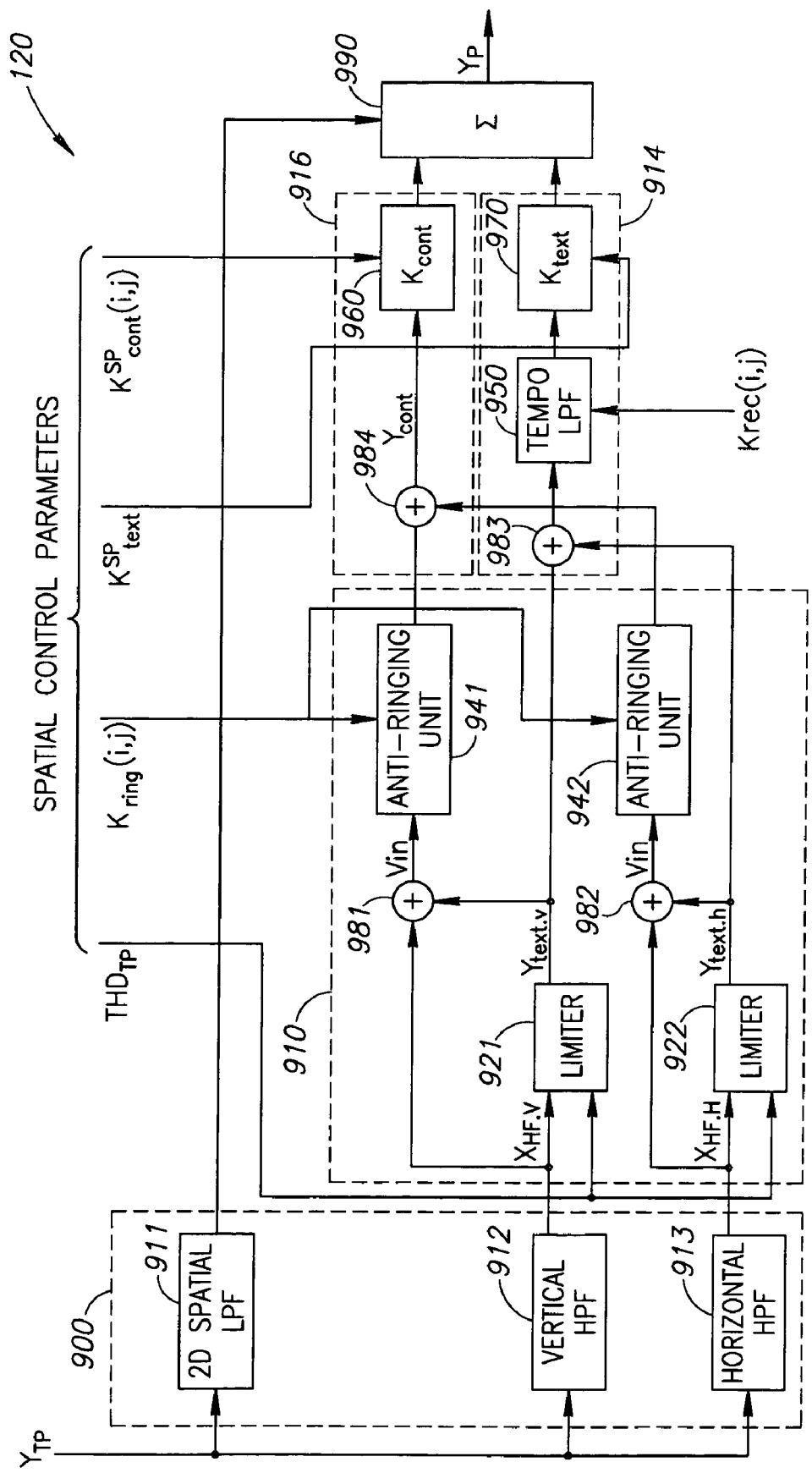
FIG. 11 is a block diagram illustration of an exemplary adaptive spatial processor forming part of the apparatus of FIG. 2.

Reference is now made to FIG. 11, which shows a non-limiting block diagram of adaptive spatial processor 120, constructed and operative in accordance with an exemplary embodiment of the present invention. Adaptive spatial processor 120 may comprise a standard spatial-temporal processor 900, a ringing eliminator 910, a texture improver 914 and a small details sharpener 916.

Spatial-temporal processor 900 may perform spatial processing on signal $Y_{TP}$ provided by processor 110 or processor 110'. Spatial-temporal processor 900 may comprise a two-dimensional (2D) spatial low pass filter (LPF) 911, a vertical high pass filter (HPF) 912, and a horizontal low pass filter (LPF) 913.

Ringing eliminator 910 may attempt to remove ringing effects in the decompressed video signal. A ringing effect (or corona effect) may appear around the edge of the decompressed block and may cause noise in the high frequency component of the decoded video signal. The ringing effect may induce annoying visual artifacts that are especially noticeable on large screen TVs.

Figure 12B:
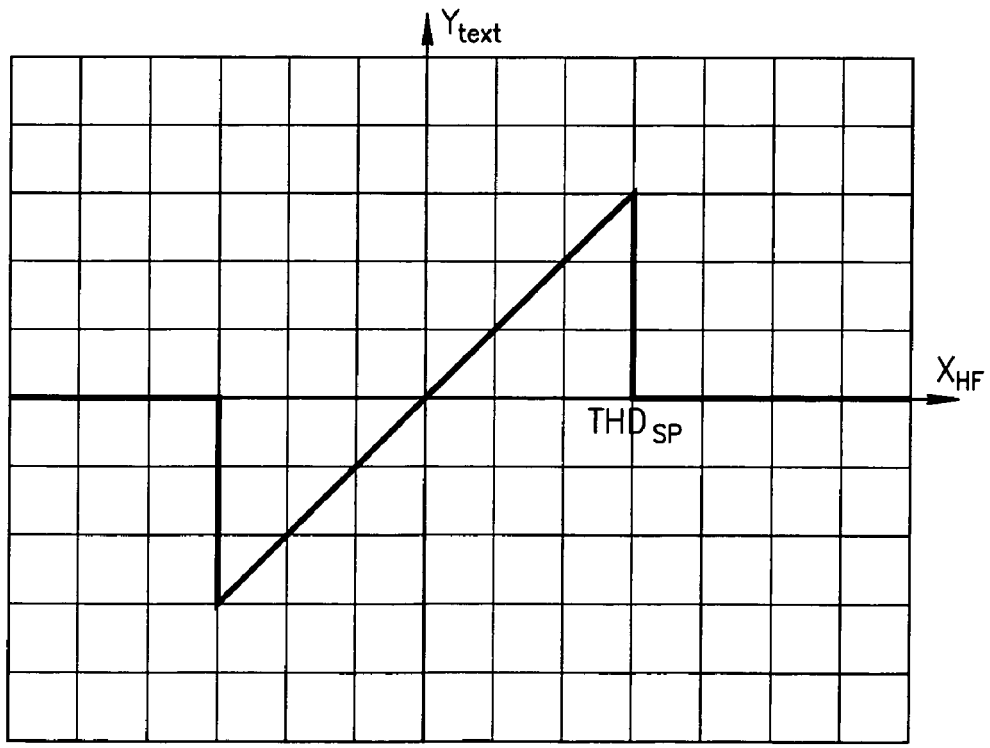

Ringing eliminator 910 may comprise limiters 921 and 922, anti-ringing units 941 and 942 as well as adders 981 and 982. A graphical representation of both limiters 921 and 922 is provided in FIG. 12B.

Ringing eliminator 910 may operate on the vertical and horizontal high frequency components of signal $Y_{TP}$, generated by vertical HPF 912 and horizontal HPF 913, respectively. To determine a texture level for horizontal and vertical components in signal $Y_{TP}$, limiters 921 and 922 may limit the intensities of high frequency signals $X_{HF,V}$ and $X_{HF,H}$, respectively, to below $THD_{SP}$. Adders 942 and 944 may sum together the inputs and outputs of limiters 921 and 922, respectively, generating signals, labeled $V_{in,V}$ and $V_{in,H}$, respectively, with strongly contrasting small details.

Figure 13:
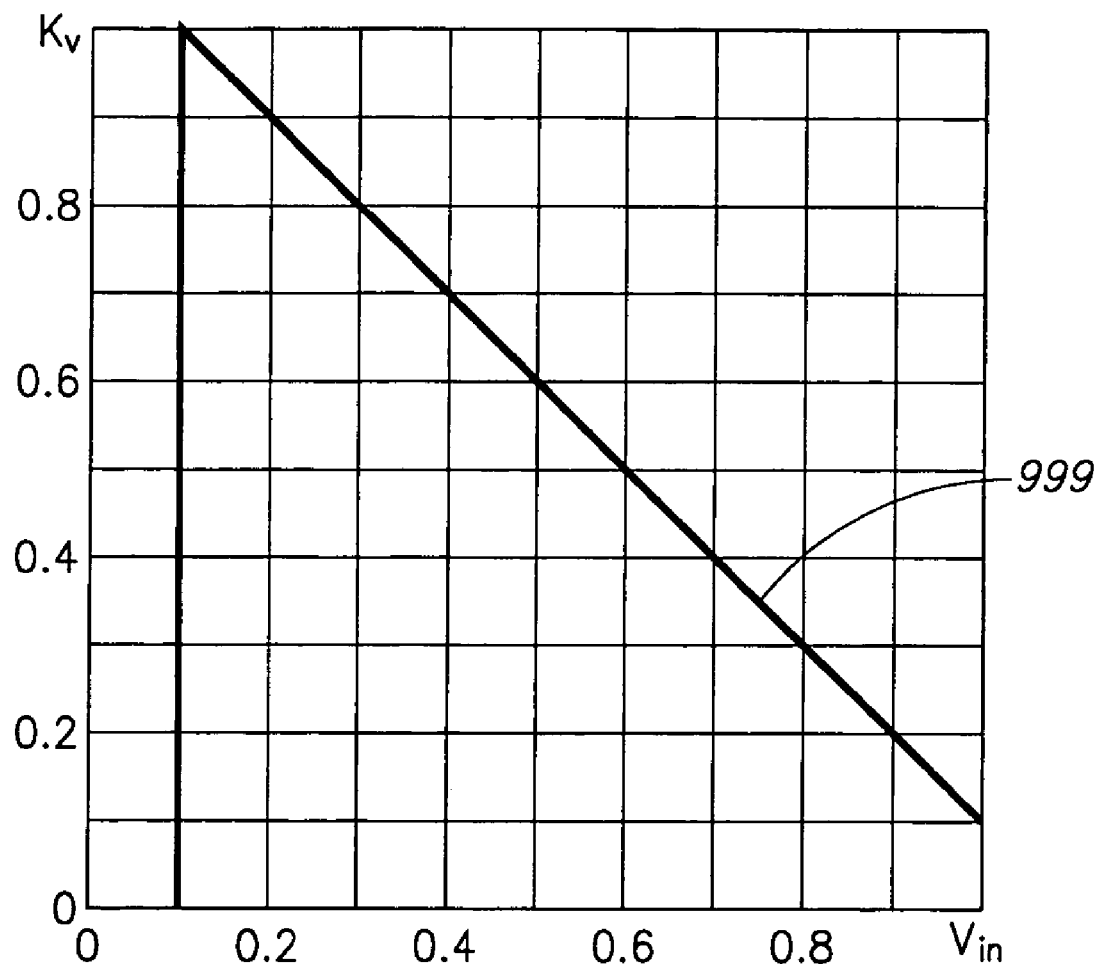
FIG. 13 is a graphical illustration of a $K_v$ function, useful in understanding the operation of the processor of FIG. 11.

Anti-ringing units 941 and 942 may receive the $V_{in}$ signals and may attenuate them, using an attenuation graph, such as that shown in FIG. 13, to which reference is now briefly made.

FIG. 13 graphs a fixed coefficient Kv as a linear inverse function 999 of the input signal Vin Anti-ringing units 941 and 942 may then weight fixed coefficient Kv by per-pixel, ringing coefficient $K_{ring}(i,j)$ to generate an anti-ringing attenuation coefficient Kar, as follows:

$$K_{ar}=K_{ring}(i,j)*K_v \quad (19)$$

Texture improver 914 may attempt to sharpen textual elements, if present, in the outputs of limiters 921 and 922. Texture improver 914 may comprise an adder 983, a temporal LPF 950 and a texture sharpener 970. Adder 983 may generate a texture signal $Y_{text}$ and temporal LPF 950 may operate on textural signal $Y_{text}$ to reduce noise using per-pixel recursion coefficient $K_{rec}(i,j)$, which may be determined in accordance with Eq. (15). Temporal LPF 950 may be an infinite impulse response (IIR) filter and may utilize per-pixel recursion coefficient $K_{rec}(i,j)$ as its recursion coefficient. It will be appreciated that recursion coefficient $K_{rec}(i,j)$ may be a function of the distortion level and small details in the image. The level of noise reduction is higher for higher values of $K_{rec}(i,j)$.

Texture sharpener 970 may be a linear operator and may adjust the texture sharpness of the output of temporal LPF 950 with the value of $K^{SP}_{text}$ determined in accordance with Eq. (13).

Small details sharpener 916 may comprise an adder 984 and a contrast sharpener 960. Adder 984 may sum the outputs of anti-ringing units 941 and 942, generating a signal, labeled $Y_{cont}$, with strongly contrasting, small details. Contrast sharpener 960 may adjust the sharpness of the small details based on the per-pixel values of $K^{SP}_{cont}(i,j)$ determined in accordance with Eq. (14). Contrast sharpener 960 may be a linear operator, i.e., it may reduce the small details sharpness with low values of $K^{SP}_{cont}(i,j)$ and may increase the sharpness with high values of $K^{SP}_{cont}(i,j)$.

A summation unit 990 may accumulate the outputs of 2D spatial LPF 911, texture improver 914 and small details sharpener 916 to generate improved quality video signal $Y_P$.

It should be appreciated by a person skilled in the art that the components of apparatus 100 disclosed herein may be hardware components, software components, firmware components, or any combination thereof.

Figure 14:
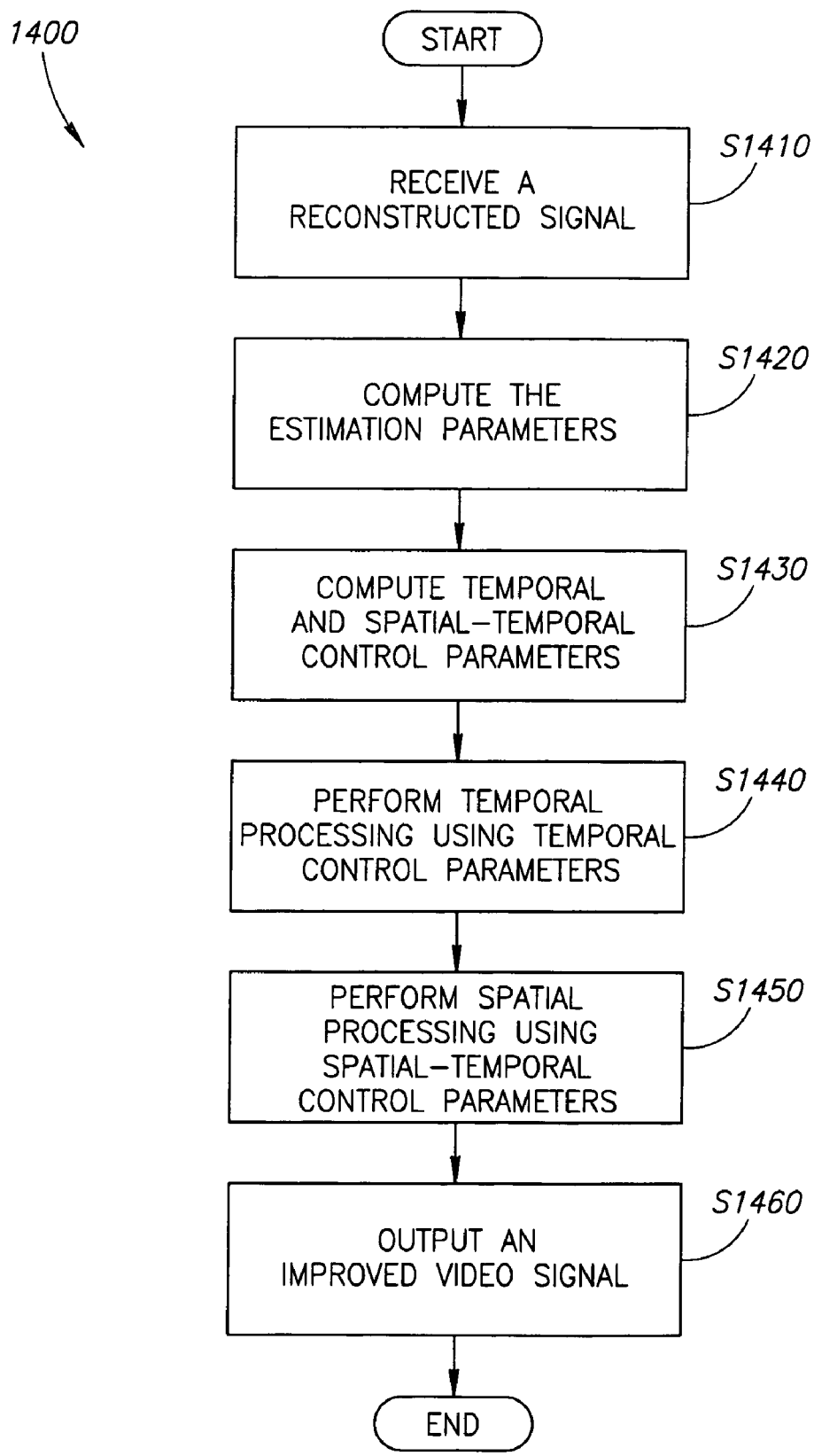
FIG. 14 is a flow chart illustration of a method of operating the apparatus of FIG. 2.

Reference is now made to FIG. 14, which shows a non-limiting flowchart 1400 describing the operation of apparatus 100 in accordance with an exemplary embodiment of the present invention. Apparatus 100 may perform the steps of FIG. 14 in order or in parallel.

At step S1410, apparatus 100 may receive decompressed signal Y. At step S1420, estimation unit 130 may estimate the amount of distortion DR, the image complexity NC, the intensity change value $h_{i,j}$, and the extent of high contrast details CH, as described in greater detail above. At step S1430, controller 140 may generate the temporal and spatial-temporal control parameters according to the equations provided hereinabove.

Utilizing the temporal control parameters, at step S1440, adaptive temporal processor 110 may temporally process decompressed signal Y to eliminate temporal dependencies and to reduce noise and blockness. In addition, adaptive temporal processor 110 may adjust the texture sharpness and the small details sharpness. At step S1450, adaptive spatial processor 120 may spatially process the output of adaptive temporal processor 110. The spatial processing may involve reducing noise and ringing effects as well as adjusting the sharpness of small details and texture components. Adaptive spatial processor 120 may utilize the spatial-temporal control parameters. At step S1460, adaptive spatial processor 120 may output the signal $Y_P$ which has enhanced video quality.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus comprising:
    an estimation unit to generate visual quality parameters that indicate visual quality of decompressed video frames; and
    a decompressed video enhancer to improve the visual quality of said decompressed video frames using said visual quality parameters,
    wherein said estimation unit comprises:
        a distortion estimator to estimate a distortion level DR in individual decompressed video frames;
        a parameter estimator to estimate an image complexity value NC and a per pixel intensity change $h_{i,j}$; and
        a high contrast details analyzer to estimate high contrast small details levels $CH_{i,j}$ in individual decompressed video frames.

2. The apparatus of claim 1, wherein said distortion estimator comprises a blockness level determiner.

3. The apparatus of claim 2, wherein said blockness level determiner comprises:
    an into line integrator to sum high frequency components in every k pixels along a line of individual decompressed video frames; and
    a line-to-line periodicity detector to sum the output of said line integrator every $k^{th}$ line, starting at different lines and to sum those blocks which are distorted.

4. The apparatus of claim 1, wherein said parameter estimator comprises:
    an intensity change generator to generate per-pixel intensity change value $h_{i,j}$; and
    an image complexity generator to determine per-frame image complexity level NC.

5. The apparatus of claim 4, wherein said intensity change generator comprises:
    a first frame memory to generate a difference frame of an individual decompressed video frame and a previous individual decompressed video frame;
    an absolute value unit to take an absolute value of said difference frame $\Delta_F$; and
    a horizontal low pass filter (LPF) to reduce noise in the output of said absolute value unit.

6. The apparatus of claim 4, wherein said image complexity generator comprises:
    a histogram difference generator to determine how different a histogram of the intensities of an individual decompressed video frame is from that of a previous individual decompressed video frame;
    a frame intensity change generator to determine an overall change value from said per-pixel intensity changes $h_{i,j}$, said overall change value indicating the extent of significant change in said individual decompressed video frames; and
    an image complexity generator to generate said per-frame image complexity level NC from a weighted sum of the outputs of said generators.

7. The apparatus of claim 1, wherein said high contrast details analyzer comprises:
    a shifter to shift high frequency components of an individual decompressed video frame downward by a first threshold THD1, wherein said first threshold THD1 is defined by expected intensity levels of high contrast details;
    a first limiter to limit high frequency components of said decompressed individual video frame to an intensity level below a second threshold;
    a two-dimensional low pass filter operating on output of said first limiter to detect dots in said decompressed individual video frame; and
    a second limiter to limit output of said two-dimensional low pass filter to an intensity level below a third threshold.

8. The apparatus of claim 1, wherein said enhancer comprises:
    an adaptive temporal processor to adapt temporal processing of individual decompressed video frame with at least one of said visual quality parameters; and
    an adaptive spatial processor to adapt spatial processing of output of said adaptive temporal processor with at least one of said visual quality parameters.

9. The apparatus of claim 8, further comprising a controller to generate at least temporal control parameters for said adaptive temporal processor and spatial-temporal control parameters for said adaptive spatial processor from at least one of said visual quality parameters.

10. The apparatus of claim 9, wherein said temporal control parameters comprise at least one of:
- a temporal threshold $THD_{TP}$ determined by: $THD_{TP}=2[(1+DR^*)+(1+NC)]$;
- a temporal texture coefficient $K^{TP}_{text}$ determined by: $K^{TP}_{text}=1-DR^*$;
- a temporal contrast coefficient $K^{TP}_{cont}$ determined by: $K^{TP}_{cont}=1-DR^*$; and
- a low frequency coefficient $K_F$ determined by: $K_F=1-0.5DR^*$, wherein said $DR^*$ is a normalized value of said distortion level DR.

11. The apparatus of claim 10, wherein said adaptive temporal processor comprises:
- a temporal processor to temporally process said individual decompressed video frames;
- a texture improver to receive vertical and horizontal high pass filtered signals from said temporal processor and to attempt to sharpen textual elements in said individual decompressed frames therefrom;
- a small details sharpener to adjust a sharpness of small details in said individual decompressed frames; and
- a distortion reducer to reduce blockness in said individual decompressed frames by attenuating low frequency components of said individual decompressed frames received from said temporal processor.

12. The apparatus of claim 11, wherein said texture improver comprises:
- a first limiter to limit an input signal level below said temporal threshold $THD_{TP}$, wherein the input signal includes vertical high frequency components of said individual decompressed frames;
- a second limiter to limit an input signal level below said temporal threshold $THD_{TP}$, wherein the input signal includes horizontal high frequency components of said individual decompressed frames;
- a horizontal low pass filter (LPF) to pass low frequency components of a signal produced by said first limiter;
- a vertical LPF to pass low frequency components of a signal produced by said second limiter; and
- a texture sharpener to adjust texture sharpness of a sum of the outputs of said LPF according to said temporal texture coefficient $K^{TP}_{text}$.

13. The apparatus of claim 12, wherein said small details sharpener comprises:
- a small details unit to generate a small details signal from said vertical and horizontal high frequency components and outputs of said limiters; and
- a small details sharpener to adjust a sharpness of said small details signal according to said temporal contrast coefficient $K^{TP}_{cont}$.

14. The apparatus of claim 11, wherein said distortion reducer comprises a blockness sharpener to reduce a level of low frequency components of said individual decompressed video frames according to said low frequency coefficient $K_F$.

15. The apparatus of claim 9, wherein said spatial-temporal control parameters comprise at least one of:
- a spatial-temporal threshold $THD_{SP}$ determined by: $THD_{SP}=3(1+DR^*)$,
- a per-pixel, recursion coefficient $K_{rec}(i,j)$ determined by: $K_{rec}(i,j)=K_{rec.o}[1+0.25(DR^*+CH_{i,j}^*)]$;
- a per-pixel ringing coefficient $K_{ring}(i,j)$ determined by: $K_{ring}(i,j)=1-0.5\,h_{ij}^*$,
- a spatial-temporal texture coefficient $K^{SP}_{text}$ determined by: $K^{SP}_{text}=K_{text.o}(1-DR^*)$; and
- a per-pixel, spatial-temporal contrast coefficient $K^{SP}_{cont}(i,j)$ determined by $K^{SP}_{cont}(i,j)=K_{cont.o}[1-0.5(DR^*-CH_{i,j}^*)]$, wherein said $DR^*$ is a normalized value of said distortion level DR, said $CH_{i,j}^*$ are normalized values of said $CH_{i,j}$ values and said $h_{ij}^*$ are normalized values of said $h_{ij}$, and wherein said $K_{cont.o}$ is a maximum contrast coefficient, said $K_{rec.o}$ is a maximum recursion coefficient, or said $K_{text.o}$ is a maximum texture coefficient.

16. The apparatus of claim 15, wherein said per-pixel, ringing coefficient $K_{ring}(i,j)$ is used to reduce ringing effects in at least one of said individual decompressed video frames.

17. The apparatus of claim 15, wherein said adaptive spatial processor comprises:
- a spatial-temporal processor to perform spatial processing on individual decompressed video frames;
- a texture improver to adjust textual elements in said individual decompressed video frames;
- a small details sharpener to adjust a sharpness of small details in said individual decompressed video frames; and
- a ringing reducer to receive vertical and horizontal high pass filtered signals from said spatial-temporal processor and to reduce ringing effects in said individual decompressed video frames.

18. The apparatus of claim 17, wherein said ringing reducer comprises:
- a first limiter to limit an input signal level below said spatial-temporal threshold $THD_{SP}$, wherein the input signal includes vertical high frequency components of said individual decompressed video frames;
- a second limiter to limit an input signal level below said spatial-temporal threshold $THD_{SP}$, wherein the input signal includes horizontal high frequency components of said individual decompressed video frames;
- a vertical anti-ringing unit to reduce ringing effects in said vertical high pass filtered signals according to said ringing coefficient $K_{ring}(i,j)$; and
- a horizontal anti-ringing to reduce ringing effects in said vertical high pass filtered signals according to said ringing coefficient $K_{ring}(i,j)$.

19. The apparatus of claim 17 wherein said small details sharpener comprises a high contrast sharpener to adjust a sharpness of said small details signal according to said spatial-temporal contrast coefficient $K^{SP}_{cont}(i,j)$.

20. The apparatus of claim 17, wherein said texture improver comprises:
- a temporal low pass filter (LPF) to reduce noise according to said recursion coefficient $K_{rec}$; and
- a texture sharpener to adjust texture sharpness of an output of said temporal LPF according to a value of said spatial-temporal texture coefficient $K^{SP}_{text}$.

21. The apparatus of claim 8, wherein said adaptive temporal processor comprises an infinite impulse response (IIR) filter to use an adaptive recursion coefficient determined at least from said estimated distortion level DR.

22. A method comprising:
- estimating, using at least one of one or more processors, visual quality parameters that indicate visual quality of decompressed video frames; and
- improving, using at least one of the one or more processors, the visual quality of said decompressed video frames using said visual quality parameters, wherein said estimating comprises estimating a distortion level DR in individual decompressed video frames, an image complexity value NC, a per pixel intensity change $h_{ij}$ and a high contrast small details level CH in individual decompressed video frames.

23. The method of claim 22, wherein said estimating comprises determining a blockness level.

24. The method of claim 23, wherein said determining comprises:
   summing high frequency components in every k pixels along a line of an individual decompressed video frame; and
   detecting line-to-line periodicity by summing the output of said high frequency summing every $k^{th}$ line, starting at different lines and by summing those blocks which are distorted.

25. The method of claim 22, wherein said estimating comprises:
   generating a per-pixel intensity change $h_{i,j}$; and
   determining a per-frame image complexity level NC.

26. The method according to claim 25, wherein said generating comprises:
   subtracting an individual decompressed video frame and a previous individual decompressed video frame to generate a difference frame $\Delta_F$;
   taking an absolute value of said difference frame $\Delta_F$; and
   horizontally low pass filtering to reduce noise in the output of said absolute value unit.

27. The method according to claim 25, wherein said determining comprises:
   subtracting, using at least one of the one or more processors, a histogram of the intensities of an individual decompressed video frame from that of a previous individual decompressed video frame;
   generating, using at least one of the one or more processors, an overall change value from said per-pixel intensity changes $h_{ij}$, said overall change value indicating the extent of significant change in said individual decompressed video frame; and
   weighted summing, using at least one of the one or more processors, the outputs of said subtracting to generate said per-frame image complexity level NC.

28. The method of claim 22, wherein said estimating comprises:
   shifting said frequency components of an individual decompressed video frame downward by a first threshold THD1, wherein said first threshold THD1 is defined by expected intensity levels of high contrast details;
   limiting high frequency components of said individual decompressed video frame to an intensity level below a second threshold;
   two-dimensional low pass filtering the output of said limiting to detect dots in said individual decompressed video frame; and
   limiting the output of said two-dimensional low pass filter to an intensity level below a third threshold.

29. The method of claim 22, wherein said improving comprises:
   temporally adapting processing of individual decompressed video frames with at least one of said visual quality parameters; and
   spatially adapting processing of output of said temporal adapting with at least one of said visual quality parameters.

30. The method of claim 29, further comprising generating at least temporal control parameters and spatial-temporal control parameters from at least one of said visual quality parameters.

31. The method of claim 30, wherein said temporal control parameters comprise at least one of:
   a temporal threshold $THD_{TP}$ determined by: $THD_{TP}=2[(1+DR^*)+(1+NC)]$;
   a temporal texture coefficient $K^{TP}_{text}$ determined by: $K^{TP}_{text}=1-DR^*$;
   a temporal contrast coefficient $K^{TP}_{cont}$ determined by: $K^{TP}_{cont}=1-DR^*$; and
   a low frequency coefficient $K_F$ determined by: $K_F=1-0.5DR^*$,
   wherein said $DR^*$ is a normalized value of said distortion level DR.

32. The method of claim 31, wherein said temporally adapting comprises:
   temporally processing said individual decompressed video frames;
   first adjusting the sharpness of textual elements in said individual decompressed video frames;
   second adjusting a sharpness of small details in said individual decompressed video frames; and
   reducing blockness in said frame by attenuating low frequency components of said individual decompressed video frames received from said temporal processing.

33. The method of claim 32, wherein said first adjusting comprises:
   first limiting, using at least one of the one or more processors, an input signal level below said temporal threshold $THD_{TP}$, wherein the input signal includes vertical high frequency components of said decompressed frame;
   second limiting, using at least one of the one or more processors, an input signal level below said temporal threshold $THD_{TP}$, wherein the input signal includes horizontal high frequency components of said decompressed frame;
   horizontal low pass filtering, using at least one of the one or more processors, of a signal produced by said first limiting;
   vertical low pass filtering, using at least one of the one or more processors, of a signal produced by said second limiting; and
   adjusting texture sharpness, using at least one of the one or more processors, of the sum of the outputs of said filtering steps according to said temporal texture coefficient $K^{TP}_{text}$.

34. The method of claim 33, wherein said adjusting comprises:
   generating a small details signal from said vertical and horizontal high frequency components and outputs of said steps of limiting; and
   adjusting a sharpness of said small details signal according to said temporal contrast coefficient $K^{TP}_{cont}$.

35. The method of claim 32, wherein said reducing blockness comprises reducing a level of low frequency components of said decompressed video frame according to said low frequency coefficient $K_F$.

36. The method of claim 30, wherein said spatial-temporal control parameters comprise at least one of:
   a spatial-temporal threshold $THD_{SP}$ determined by: $THD_{SP}=3(1+DR^*)$;
   a per-pixel recursion coefficient $K_{rec}(i,j)$ determined by: $K_{rec}(i,j)=K_{rec,o}[1+0.25(DR^*+CH_{i,j}^*)]$;
   a per-pixel ringing coefficient $K_{ring}(i,j)$ determined by: $K_{ring}(i,j)=1-0.5\,h_{ij}^*$;

a spatial-temporal texture coefficient $K^{SP}_{text}$ determined by: $K^{SP}_{text} = K_{text.o}(1-DR^*)$; and a per-pixel, spatial-temporal contrast coefficient $K^{SP}_{cont}(i,j)$ determined by $K^{SP}_{cont}(i,j)=K_{cont.o}[1-0.5(DR^*-CH_{i,j}^*)]$, wherein said DR* is a normalized value of said distortion level DR, said $CH_{i,j}^*$ are normalized values of said $CH_{i,j}$ values and said $h_{i,j}^*$ are normalized values of said $h_{i,j}$, and wherein said $K_{cont.o}$ is a maximum contrast coefficient, said $K_{rec.o}$ is a maximum recursion coefficient, and said $K_{text.o}$ is a maximum texture coefficient.

37. The method of claim 36, further comprising using said per-pixel, ringing coefficient $K_{ring}(i,j)$ to reduce ringing effects in said individual decompressed video frames.

38. The method of claim 36, wherein said spatially adapting comprises:
performing spatial processing on said individual decompressed video frames;
adjusting textual elements in said individual decompressed video frames;
sharpening small details in said individual decompressed video frames; and
reducing ringing effects in said individual decompressed video frames.

39. The method of claim 38, wherein said reducing comprises:
first limiting an input signal level below said spatial-temporal threshold $THD_{SP}$, wherein the input signal includes vertical high frequency components of said decompressed frame;
second limiting an input signal level below said spatial-temporal threshold $THD_{SP}$, wherein the input signal includes horizontal high frequency components of said decompressed frame; and
reducing ringing effects in high pass filtered signals according to said ringing coefficient $K_{ring(i,j)}$.

40. The method of claim 38, wherein said sharpening comprises adjusting a sharpness of said small details signal according to said spatial-temporal contrast coefficient $K^{SP}_{cont}(i,j)$.

41. The method of claim 38, wherein said adjusting comprises:
a temporally low pass filtering to reduce noise according to said recursion coefficient $K_{rec}$; and
adjusting texture sharpness of output of said filtering according to a value of said spatial-temporal texture coefficient $K^{SP}_{text}$.

42. The method of claim 29, wherein said temporally adapting comprises an infinite impulse response (IIR) filtering using an adaptive recursion coefficient determined at least from said estimated distortion level DR.

43. A computer-readable storage medium embodying computer-readable instructions which, when executed, implement a method comprising:
estimating visual quality parameters that indicate visual quality of decompressed video frames; and
improving the visual quality of said decompressed video frames using one or more of said visual quality parameters,
wherein said estimating comprises-estimating a distortion level DR in individual decompressed video frames, an image complexity value NC, a per pixel intensity change $h_{i,j}$ and a high contrast small details level CH in individual decompressed video frames.

44. A computer-readable storage media embodying computer-readable instructions of claim 43, wherein said estimating comprises determining a blockness level.

45. A computer-readable storage media embodying computer-readable instructions of claim 43, wherein said estimating comprises:
generating the per-pixel intensity change $h_{ij}$; and
determining the per-frame image complexity level NC.

46. A computer-readable storage media embodying computer-readable instructions of claim 43, wherein said improving comprises:
temporally adapting processing of said decompressed video frame with at least one of said visual quality parameters; and
spatially adapting processing of output of said temporal adapting with at least one of said visual quality parameters.

47. A computer-readable storage media embodying computer-readable instructions of claim 46, wherein said temporally adapting comprises:
temporally processing said decompressed video frames;
first adjusting sharpness of textual elements in said decompressed video frames;
second adjusting sharpness of small details in said decompressed video frames; and
reducing blockness in said decompressed video frames by attenuating low frequency components of said decompressed video frames received from said temporal processing.

48. A computer-readable storage media embodying computer-readable instructions of claim 46, wherein said spatially adapting comprises:
performing spatial processing on said decompressed video frames;
adjusting textual elements in said decompressed video frames;
sharpening small details in said decompressed video frames; and
reducing ringing effects in said decompressed video frames.

49. A computer-readable storage media embodying computer-readable instructions of claim 46, wherein said temporally adapting comprises an infinite impulse response (IIR) filtering using an adaptive recursion coefficient determined at least from said estimated distortion level DR.

* * * * *